United States Patent
Chiu et al.

(10) Patent No.: US 11,805,245 B2
(45) Date of Patent: Oct. 31, 2023

(54) LATENCY REDUCTION FOR REORDERING PREDICTION CANDIDATES

(71) Applicant: MediaTek Inc., Hsinchu (TW)

(72) Inventors: Chih-Yao Chiu, Hsinchu (TW);
Chun-Chia Chen, Hsinchu (TW);
Chih-Wei Hsu, Hsinchu (TW);
Ching-Yeh Chen, Hsinchu (TW);
Tzu-Der Chuang, Hsinchu (TW);
Yu-Wen Huang, Hsinchu (TW)

(73) Assignee: MediaTek Inc.

( * ) Notice: Subject to any disclaimer, the term of this patent is extended or adjusted under 35 U.S.C. 154(b) by 0 days.

(21) Appl. No.: 17/874,009

(22) Filed: Jul. 26, 2022

(65) Prior Publication Data
US 2023/0047501 A1 Feb. 16, 2023

Related U.S. Application Data

(60) Provisional application No. 63/233,346, filed on Aug. 16, 2021.

(51) Int. Cl.
*H04N 19/105* (2014.01)
*H04N 19/176* (2014.01)
(Continued)

(52) U.S. Cl.
CPC ......... *H04N 19/105* (2014.11); *H04N 19/136* (2014.11); *H04N 19/176* (2014.11); *H04N 19/182* (2014.11)

(58) Field of Classification Search
CPC .. H04N 19/105; H04N 19/136; H04N 19/176; H04N 19/182; H04N 19/573; H04N 19/577; H04N 19/52
See application file for complete search history.

(56) References Cited

U.S. PATENT DOCUMENTS

2018/0241993 A1  8/2018  Panusopone et al.
2019/0281285 A1  9/2019  Piao et al.
(Continued)

FOREIGN PATENT DOCUMENTS

CN  103891283 A  6/2014
CN  110876063 A  3/2020
(Continued)

OTHER PUBLICATIONS

Taiwan Intellectual Property Office, Office Action in Taiwan Patent Application No. 111130543, dated May 4, 2023.
(Continued)

*Primary Examiner* — Nam D Pham
(74) *Attorney, Agent, or Firm* — Han IP PLLC; Andy M. Han

(57) ABSTRACT

For each prediction candidate of a set of one or more prediction candidates of the current block, a video coder computes a matching cost between a set of reference pixels of the prediction candidate in a reference picture and a set of neighboring pixels of a current block in a current picture. The video coder identifies a subset of the reference pictures as major reference pictures based on a distribution of the prediction candidates among the reference pictures of the current picture. A bounding block is defined for each major reference picture, the bounding block encompassing at least portions of multiple sets of reference pixels for multiple prediction candidates. The video coder assigns an index to each prediction candidate based on the computed matching cost of the set of prediction candidates. A selection of a prediction candidate is signaled by using the assigned index of the selected prediction candidate.

15 Claims, 16 Drawing Sheets

(51) Int. Cl.
*H04N 19/182* (2014.01)
*H04N 19/136* (2014.01)

(56) References Cited

U.S. PATENT DOCUMENTS

| | | |
|---|---|---|
| 2021/0044821 A1 | 2/2021 | Galpin et al. |
| 2021/0250580 A1 | 8/2021 | Chen et al. |
| 2022/0224911 A1* | 7/2022 | Park .................... H04N 19/139 |

FOREIGN PATENT DOCUMENTS

| | | |
|---|---|---|
| CN | 110933423 A | 3/2020 |
| CN | 110944170 A | 3/2020 |
| EP | 3443746 A1 | 2/2019 |

OTHER PUBLICATIONS

China National Intellectual Property Administraion, International Search Report and Written Opinion for PCT/CN2022/112154, dated Nov. 10, 2022.

* cited by examiner

US 11,805,245 B2

LATENCY REDUCTION FOR REORDERING PREDICTION CANDIDATES

CROSS REFERENCE TO RELATED PATENT APPLICATION(S)

The present disclosure is part of a non-provisional application that claims the priority benefit of U.S. Provisional Patent Application No. 63/233,346, filed on 16 Aug. 2021. Content of above-listed application is herein incorporated by reference in its entirety.

TECHNICAL FIELD

The present disclosure relates generally to video coding. In particular, the present disclosure relates to methods of ordering prediction candidates for selection that reduce latency.

BACKGROUND

Unless otherwise indicated herein, approaches described in this section are not prior art to the claims listed below and are not admitted as prior art by inclusion in this section.

High-Efficiency Video Coding (HEVC) is an international video coding standard developed by the Joint Collaborative Team on Video Coding (JCT-VC). HEVC is based on the hybrid block-based motion-compensated DCT-like transform coding architecture. The basic unit for compression, termed coding unit (CU), is a 2N×2N square block of pixels, and each CU can be recursively split into four smaller CUs until the predefined minimum size is reached. Each CU contains one or multiple prediction units (PUs).

To increase the coding efficiency of motion vector (MV) coding in HEVC, HEVC has the Skip, and Merge mode. Skip and Merge modes obtain the motion information from spatially neighboring blocks (spatial candidates) or a temporal co-located block (temporal candidate). When a PU is Skip or Merge mode, no motion information is coded, instead, only the index of the selected candidate is coded. For Skip mode, the residual signal is forced to be zero and not coded. In HEVC, if a particular block is encoded as Skip or Merge, a candidate index is signaled to indicate which candidate among the candidate set is used for merging. Each merged prediction unit (PU) reuses the MV, prediction direction, and reference picture index of the selected candidate.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

Some embodiments of the disclosure provide methods of reducing latency when computing matching cost for reordering prediction candidates. For each prediction candidate of a set of one or more prediction candidates of the current block, a video coder computes a matching cost between a set of reference pixels of the prediction candidate in a reference picture and a set of neighboring pixels of a current block in a current picture. The video coder assigns an index to each prediction candidate based on the computed matching cost of the set of prediction candidates. A selection of a prediction candidate is signaled by using the assigned index of the selected prediction candidate. The video coder encodes or decodes the current block by using the selected prediction candidate to reconstruct the current block.

In some embodiments, the video coder identifies a subset of the reference pictures as major reference pictures based on a distribution of the prediction candidates among the reference pictures of the current picture. A bounding block is defined for each major reference picture, the bounding block encompassing at least portions of multiple sets of reference pixels for multiple prediction candidates. The content of the bounding block may be retrievable by one single dynamic random access memory (DRAM) access. The retrieved content of the bounding block may be stored for encoding or decoding one or more blocks that are after the current block in decoding order.

In some embodiments, a prediction candidate that references a first, non-major reference picture is scaled or projected to a second, major reference picture such that the projected prediction candidate references pixels in the second major reference picture. A bounding block defined for the second major reference picture may include the pixels referenced by the projected prediction candidate. In some embodiments, a prediction candidate that references a non-major reference picture is removed from the set of prediction candidates for the current block.

In some embodiments, the reference pixels of a particular prediction candidate may include a set of available pixels encompassed by the bounding block and a set of unavailable pixels not encompassed by the bounding block. The matching cost of the particular prediction candidate is computed based on the set of available pixels and not on the set of unavailable pixels. In some embodiments, the matching cost of the particular prediction candidate is computed by replacing the set of unavailable pixels by padding values. In some embodiments, the matching cost of the particular prediction candidate is computed by scaling a cost computed based on the set of available pixels and not on the set of unavailable pixels to all reference pixels of the particular prediction candidate.

In some embodiments, the set of neighboring pixels of the current block includes a set of available pixels encompassed by a first block and a set of unavailable pixels encompassed by a second block, the first block is not one of N most recently reconstructed blocks in decoding order and the second block is one of N most recently reconstructed blocks in decoding order. The matching costs are computed based on the set of available pixels and not on the set of unavailable pixels of the neighboring pixels of the current block. In some embodiments, the matching costs are computed by replacing the set of unavailable pixels with padding values. In some embodiments, the set of neighboring pixels comprises pixels that are adjacent to an ancestor or a higher level structure that includes the current block but not adjacent to the current block.

BRIEF DESCRIPTION OF THE DRAWINGS

The accompanying drawings are included to provide a further understanding of the present disclosure and are incorporated in and constitute a part of the present disclosure. The drawings illustrate implementations of the present disclosure and, together with the description, serve to explain the principles of the present disclosure. It is appreciable that the drawings are not necessarily in scale as some

DETAILED DESCRIPTION

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

I. Candidate Reordering for Merge Mode

Figure 1:
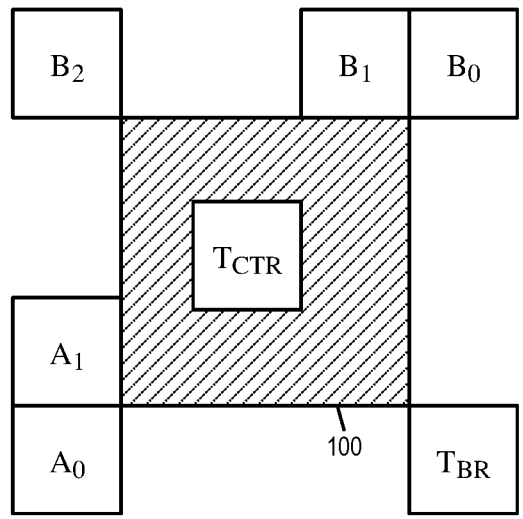
FIG. 1 illustrates the motion candidates of merge mode.

FIG. 1 illustrates the motion candidates of merge mode. The figure shows a current block 100 of a video picture or frame being encoded or decoded by a video codec. As illustrated, up to four spatial MV candidates are derived from spatial neighbors A0, A1, B0 and B1, and one temporal MV candidate is derived from TBR or TCTR (TBR is used first, if TBR is not available, TCTR is used instead). If any of the four spatial MV candidates is not available, the position B2 is then used to derive MV candidate as a replacement. After the derivation process of the four spatial MV candidates and one temporal MV candidate, removing redundancy (pruning) is applied in some embodiments to remove redundant MV candidates. If after removing redundancy (pruning), the number of available MV candidates is smaller than five, three types of additional candidates are derived and are added to the candidate set (candidate list). A video encoder selects one final candidate within the candidate set for Skip, or Merge modes based on the rate-distortion optimization (RDO) decision and transmits the index to a video decoder. (Skip mode and merge mode are collectively referred to as "merge mode" in this document.)

For some embodiments, merge candidates are defined as the candidates of a general "prediction+merge" algorithm framework. The "prediction+merge algorithm framework has a first part and a second part. The first part generating a candidate list (a set) of predictors that are derived by inheriting neighboring information or refining or processing neighboring information. The second part is sending (i) a merge index to indicate which inheriting neighbor in the candidate list is selected and (ii) some side information related to the merge index. In other words, the encoder signals the merge index and some side information for the selected candidate to the decoder.

Figure 2:
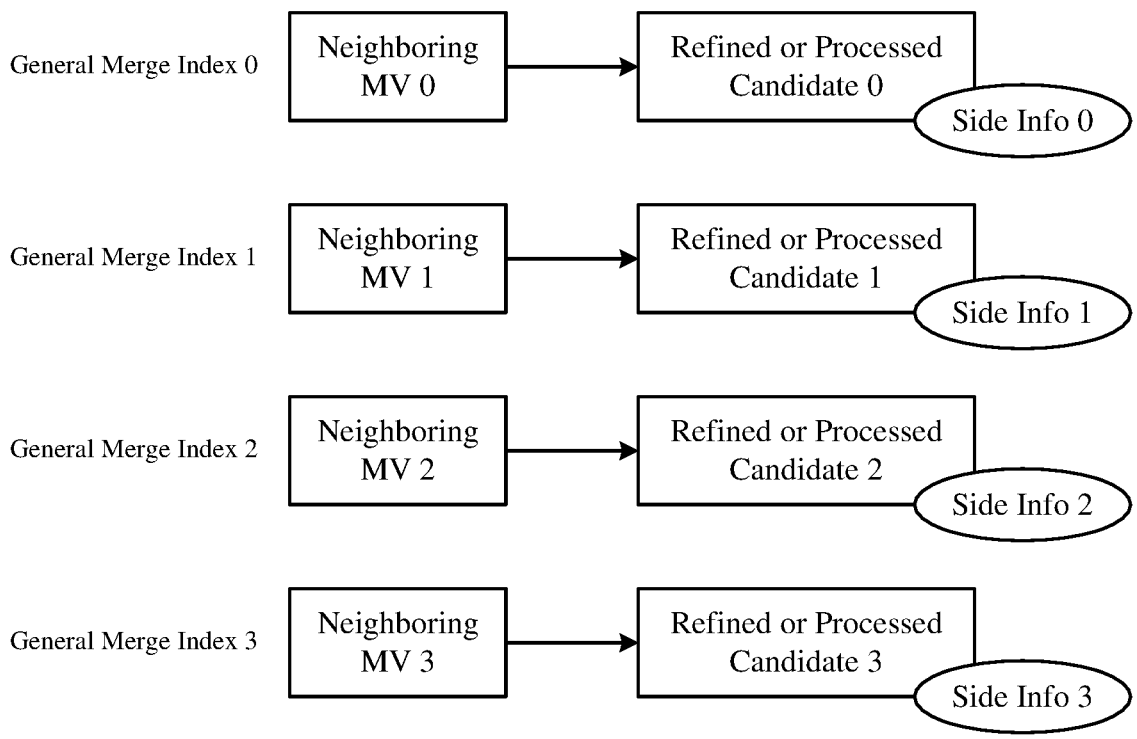
FIG. 2 conceptually illustrates a "prediction+merge" algorithm framework for merge candidates.

FIG. 2 conceptually illustrates the "prediction+merge" algorithm framework for merge candidates. The candidate list includes many candidates that inherit neighboring information. The inherited information is then processed or refined to form new candidates. During the processes, some side information for the candidates is generated and sent to decoder.

Video coders (encoders or decoders) may process merge candidates in different ways. Firstly, in some embodiments, a video coder may combine two or more candidates into one candidate. Secondly, in some embodiments, a video coder may use the original candidate to be the original MV predictor and perform motion estimation searching using the current block of pixels to find a final MVD (Motion Vector Difference), where the side information is the MVD. Thirdly, in some embodiments, a video coder may use the original candidate to be the original MV predictor and perform motion estimation searching using the current block of pixels to find a final MVD for L0, and the L1 predictor is the original candidate. Fourthly, in some embodiments, a video coder may use the original candidate to be the original MV predictor and perform motion estimation searching using current block pixels to find a final MVD for L1, and the L0 predictor is the original candidate. Fifthly, in some embodiments, a video coder may use the original candidate to be the original MV predictor and do MV refinement searching using top or left neighboring pixels as searching template to find a final predictor. Sixthly, a video coder may use the original candidate to be the original MV predictor and perform MV refinement searching using bi-lateral template (pixels on L0 and L1 reference pictures pointed by candidate MV or mirrored MV) as searching template to find a final predictor.

Template matching (TM) is a video coding method to refine a prediction of the current CU by matching a template (current template) of the current CU in the current picture and a reference template in a reference picture for the prediction. A template of a CU or block generally refers to a specific set of pixels neighboring the top and/or the left of the CU.

For this document, the term "merge candidate" or "candidate" means the candidate in the general "prediction+merge" algorithm framework. The "prediction+merge" algorithm framework is not restricted to the previous described embodiments. Any algorithm having "prediction+merge index" behavior all belongs to this framework.

In some embodiments, a video coder reorders the merge candidates, i.e., the video coder modifies the candidate order inside the candidate list to achieve better coding efficiency. The reorder rule depends on some pre-calculation for the current candidates (merge candidates before the reordering), such as upper neighbor condition (modes, MVs and so on) or left neighbor condition (modes, MVs and so on) of the current CU, the current CU shape, or up/left L-shape template matching.

Figure 3:
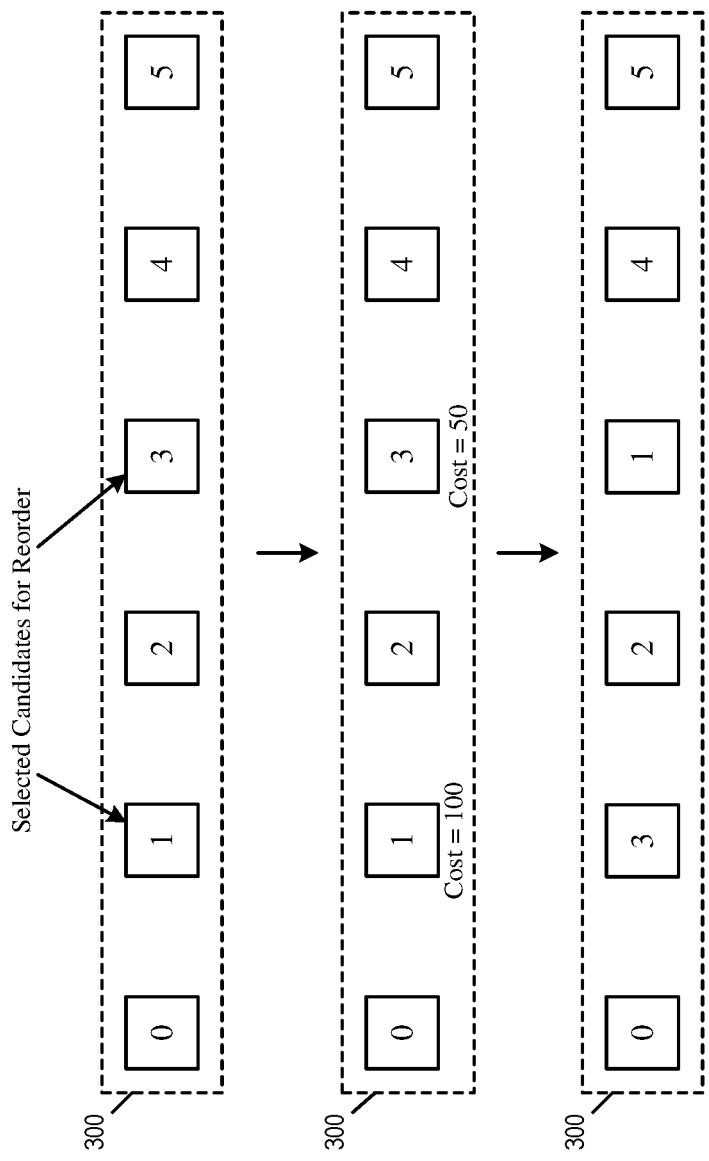
FIG. 3 conceptually illustrates an example candidate reordering.

FIG. 3 conceptually illustrates an example candidate reordering. As illustrated, an example merge candidate list 300 has six candidates labeled '0' through '5'. The video coder initially selects some candidates (candidates labeled '1' and '3') for reordering. The video coder then pre-calculates the cost of those candidates (100 and 50 for candidates labeled '1' and '3' respectively). The cost is named as the guess-cost of the candidate (since this is not the true cost of using the candidate and is only an estimate or guess of the true cost), the lower the cost means the better the candidate. Finally, the video coder reorders the selected candidates by moving lower cost candidates (the candidate labeled '3') to the front of the list.

In general, for a merge candidate Ci having an order position Oi in the merge candidate list (with i=0~N−1, N is total number of candidates in the list, Oi=0 means Ci is at the beginning of the list and Oi=N−1 means Ci is at the end of the list), with Oi=i (C0 order is 0, C1 order is 1, C2 order is 2, . . . and so on), the video coder reorders merge candidates in the list by changing the Oi for Ci for selected values of i (changing the order of some selected candidates).

In some embodiments, Merge Candidate Reordering can be turned off according to the size or shape of the current PU or CU. The video coder may pre-define several PU sizes or shapes for turning-off Merge Candidate Reordering. In some embodiments, other conditions are involved for turning off the Merge Candidate Reordering, such as picture size, QP value, and so on, being certain predefined values. In some embodiments, the video coder may signal a flag to switch on or off Merge Candidate Reordering. For example, a flag (e.g., "merge_cand_rdr_en") may be signaled to indicate whether "Merge Candidate Reorder" is enabled (value 1:enabled, value 0:disabled). When not present, the value of merge_cand_rdr_en is inferred to be 1. The minimum sizes of units in the signaling, merge_cand_rdr_en, can also be separately coded in sequence level, picture level, slice level, or PU level.

Generally, a video coder may perform candidate reordering by (1) identifying one or more candidates for reordering, (2) calculating a guess-cost for each identified candidate, and (3) reordering the candidates according to the guess-costs of the selected candidates. In some embodiments, the calculated guess-costs of some of the candidates are adjusted (cost adjustment) before the candidates are reordered.

In some embodiments, a L-shape matching method is used for calculating the guess-costs of selected candidates. For the currently selected merge candidate, the video coder retrieves a L-shape template of current picture (current template) and a L-shape template of reference picture (reference template) and compares the difference between the two templates. The L-shape matching method has two parts or steps: (i) identifying the L-shape templates and (ii) matching the derived templates to determine the guess cost, or the matching cost of the candidate.

Figure 4:
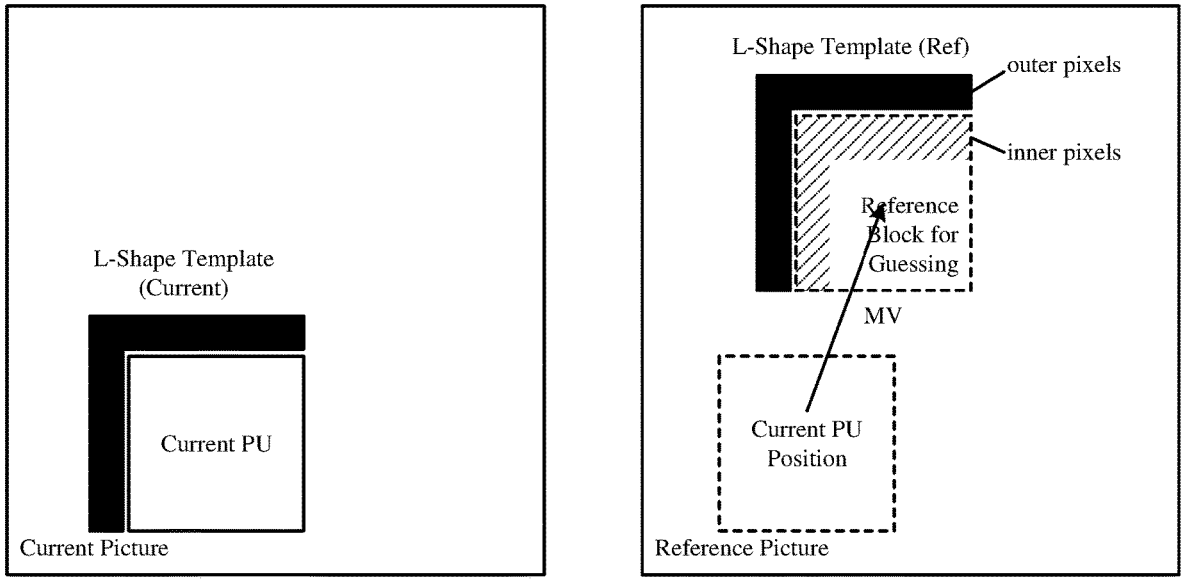
FIGS. 4-5 conceptually illustrate the L-shape matching method for calculating the matching costs of selected candidates.
Figure 5:
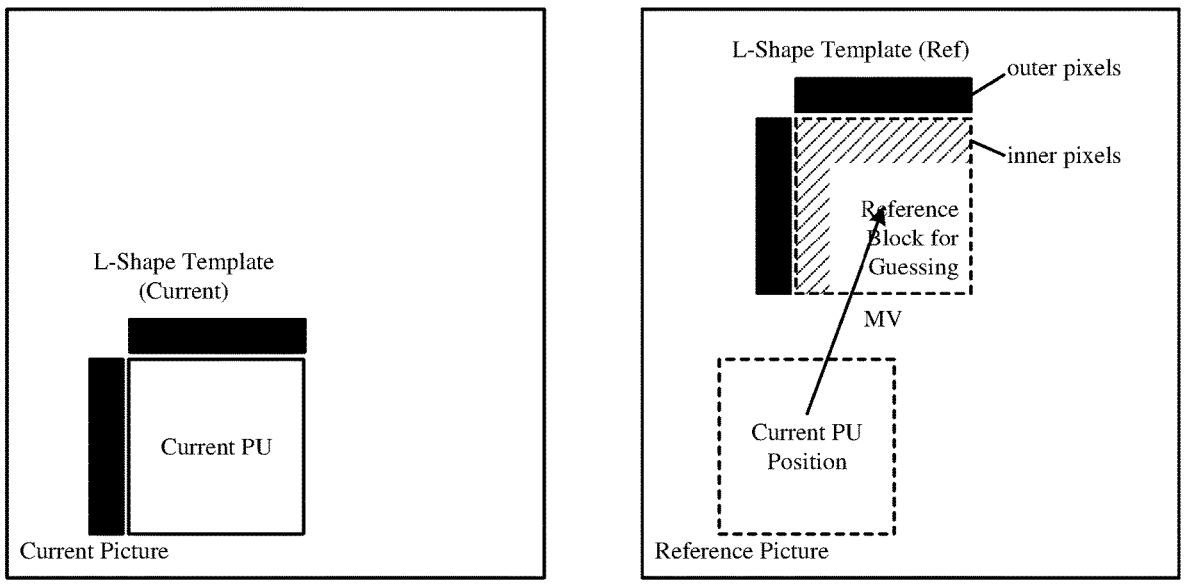

FIGS. 4-5 conceptually illustrate the L-shape matching method for calculating the guess costs of selected candidates. FIG. 4 shows a L-shape template of the current CU (current template) in the current picture that includes some pixels around top and left boundaries of the current PU or CU. The L-shape template of reference picture includes some pixels around top and left boundaries of reference_block_for_guessing for current merge candidate. The reference_block_for_guessing (with width BW and height BH same as current PU) is the block pointed by integer part of the motion vector of the current merge candidate.

Different embodiments define the L-shape template differently. In some embodiments, all pixels of L-shape template are outside the reference_block_for_guessing (as "outer pixels" label in FIG. 4). In some embodiments, all pixels of L-shape template are inside the reference_block_for_guessing (as "inner pixels" label in FIG. 4). In some embodiments, some pixels of L-shape template are outside the reference_block_for_guessing and some pixels of L-shape template are inside the reference_block_for_guessing. FIG. 5 shows a L-shape template of the current PU or CU (current template) in the current picture that is similar to that of FIG. 4 but has no left-top corner pixels, and the L-shape template in the reference picture (of outer pixel embodiment) has no left-top corner pixels.

In some embodiments, the L-shaped matching method and the corresponding L-shape template (named template_std) is defined according to the following: assuming the width of current PU is BW, and height of current PU is BH, the L-shape template of current picture has a top part and a left part. Defining top thick=TTH, left thick=LTH, then, the top part includes all current picture pixels of coordinate (ltx+tj, lty−ti), in which ltx is the Left-top integer pixel horizontal coordinate of the current PU, lty is the Left-top integer pixel vertical coordinate of the current PU, ti is an index for pixel lines (ti is 0 (TTH-1)), tj is a pixel index in a line (tj is 0~BW-1). For the left part, it includes all current picture pixels of coordinate (ltx−tjl, lty+til), in which ltx is the Left-top integer pixel horizontal coordinate of the current PU, lty is the Left-top integer pixel vertical coordinate of the current PU, til is a pixel index in a column (til is 0~(BH-1)), tjl is an index of columns (tjl is 0~(LTH-1)).

In template_std, the L-shape template of reference picture has a top part and a left part. Defining top thickness=TTHR, left thickness=LTHR, then, top part includes all reference picture pixels of coordinate (ltxr+tjr, ltyr−tir+shifty), in which ltxr is the Left-top integer pixel horizontal coordinate of the reference_block_for_guessing, ltyr is the Left-top integer pixel vertical coordinate of the reference_block_for_guessing, tir is an index for pixel lines (tir is 0 (TTHR-1)), tjr is a pixel index in a line (tjr is 0-BW-1), shifty is a pre-define shift value. For the left part, it consists of all reference picture pixels of coordinate (ltxr−tjlr+shiftx, ltyr+tilr), in which ltxr is the Left-top integer pixel horizontal coordinate of the reference_block_for_guessing, ltyr is the Left-top integer pixel vertical coordinate of the reference_block_for_guessing, tilr is a pixel index in a column (tilr is 0~(BH-1)), tjlr is an index of columns (tjlr is 0~(LTHR-1)), shiftx is a pre-define shift value.

There is one L-shape template for reference picture if the current candidate only has L0 MV or only has L1 MV. But there are 2 L-shape templates for the reference picture if the current candidate has both L0 and L1 MVs (bi-prediction candidate), one template is pointed to by the L0 MV in the L0 reference picture, the other template is pointed to by L1 MV in the L1 reference picture.

In some embodiments, for the L-shape template, the video coder has an adaptive thickness mode. The thickness is defined as the number of pixel rows for the top part in L-shape template or the number of pixel columns for the left part in L-shape template. For the previously mentioned L-shape template template_std, the top thickness is TTH and left thickness is LTH in the L-shape template of current picture, and the top thickness is TTHR and left thickness is LTHR in the L-shape template of reference picture. The adaptive thickness mode changes the top thickness or left thickness depending on some conditions, such as the current PU size or the current PU shape (width or height) or the QP of current slice. For example, the adaptive thickness mode can let top thickness=2 if current PU height 32, and top thickness=1 if current PU height<32.

When performing L-shape template matching, the video coder retrieves the L-shape template of current picture and L-shape template of reference picture and compares (matches) the difference between the two templates. The difference (e.g., Sum of Absolute Difference, or SAD) between the pixels in the two templates is used as the matching cost of the MV. In some embodiments, the video coder may obtain the selected pixels from the L-shape template of the current picture and the selected pixels from the L-shape template of reference picture before computing the difference between the selected pixels of the two L-shape templates.

II. Reduced Latency Matching Cost Computation

Reordering of merge candidates based on computed L-shaped template matching (TM) costs may incur additional latency when (1) retrieving pixels of the L-shape template of the current CU from neighboring CUs that are too recently reconstructed, and (2) reading reference pixels from DRAM. Some embodiments of the disclosure provide methods of reducing the latency introduced by retrieving reconstructed pixels of L-shape template of current CU. When performing computing matching costs for merge reorder (reordering of merge candidates based on matching costs), the pixels of the L-shaped template of the current CU that belong to the most recently reconstructed N CUs in decoding order may be excluded from matching cost computation. (N is a positive integer.) This method can also be applied to illumination compensation (LIC).

Figure 6B:
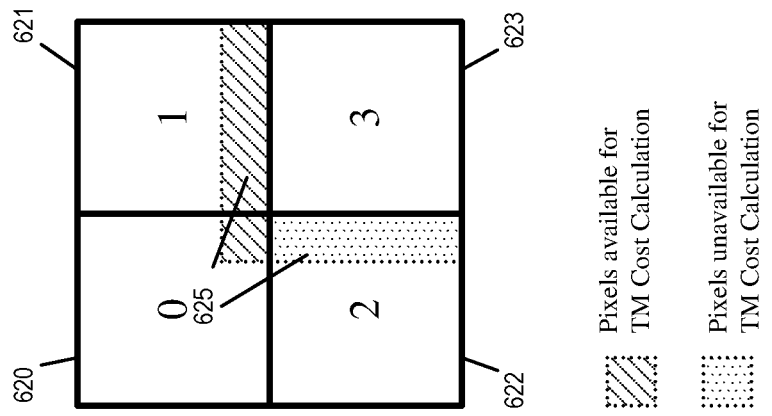
FIGS. 6A-B conceptually illustrate L-shaped templates in which pixels belonging to the most recently reconstructed blocks are excluded from matching cost computation.
Figure 6A:
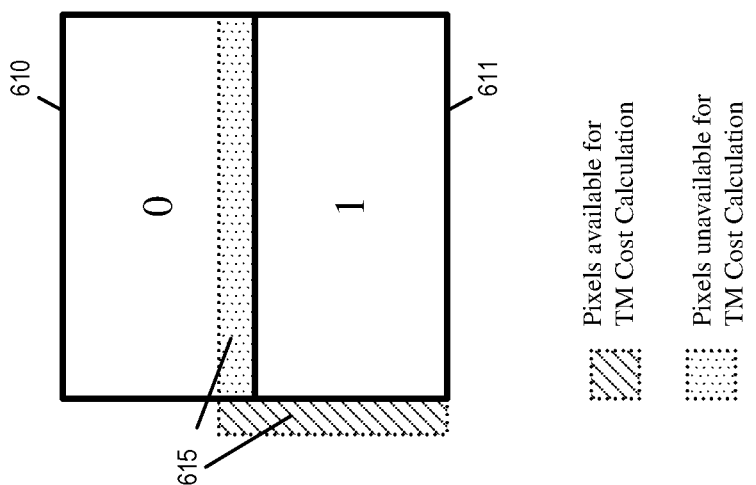

FIGS. 6A-B conceptually illustrate L-shaped templates in which pixels belonging to the most recently reconstructed N CUs are excluded from matching cost computation. In the example illustrated, the positive integer N is set to 1. Each CU is labeled with its decoding order. FIG. 6A illustrates a BT split that created two CUs 610 and CU 611. The CU 610 is reconstructed immediately before (and above) the current CU 611 in decoding order. The L-shaped template 615 of the CU 611 includes pixels that are in the CU 610. As illustrated, those pixels are designated as unavailable for determining the matching cost of the CU 611 since they are in a CU that is immediately prior in decoding order.

FIG. 6B illustrates a QT split that created four CUs 620-623, wherein the CU 622 is immediately before the current CU 623 in decoding order, while the CUs 620 and 621 are further before (before the CU 622) in decoding order. The L-shaped template 625 of the CU 623 includes pixels that are in the CUs 620-622. As illustrated, the pixels of the L-shape template 625 that are in the CU 622 are designated as unavailable for matching cost computation of the CU 623 since those pixels are in a CU immediately prior to the current CU in decoding order. The pixels of the L-shaped template 625 that are in the CU 620-621 are available for determining the matching cost of the CU 623 because they are not immediately prior to the current CU in decoding order.

In some embodiments, instead of using L-shape template of the current CU, pixels from the following candidates related to higher level video coding structure are used to perform merge reorder (by computing matching cost) for reducing latency: (1) L-shape template of the ancestor of the current CU; (2) L-shape template of a Video Processing and Distribution Unit (VPDU) to which the current CU belongs; and (3) L-shape template of the CTU to which the current CU belongs.

Figure 7:
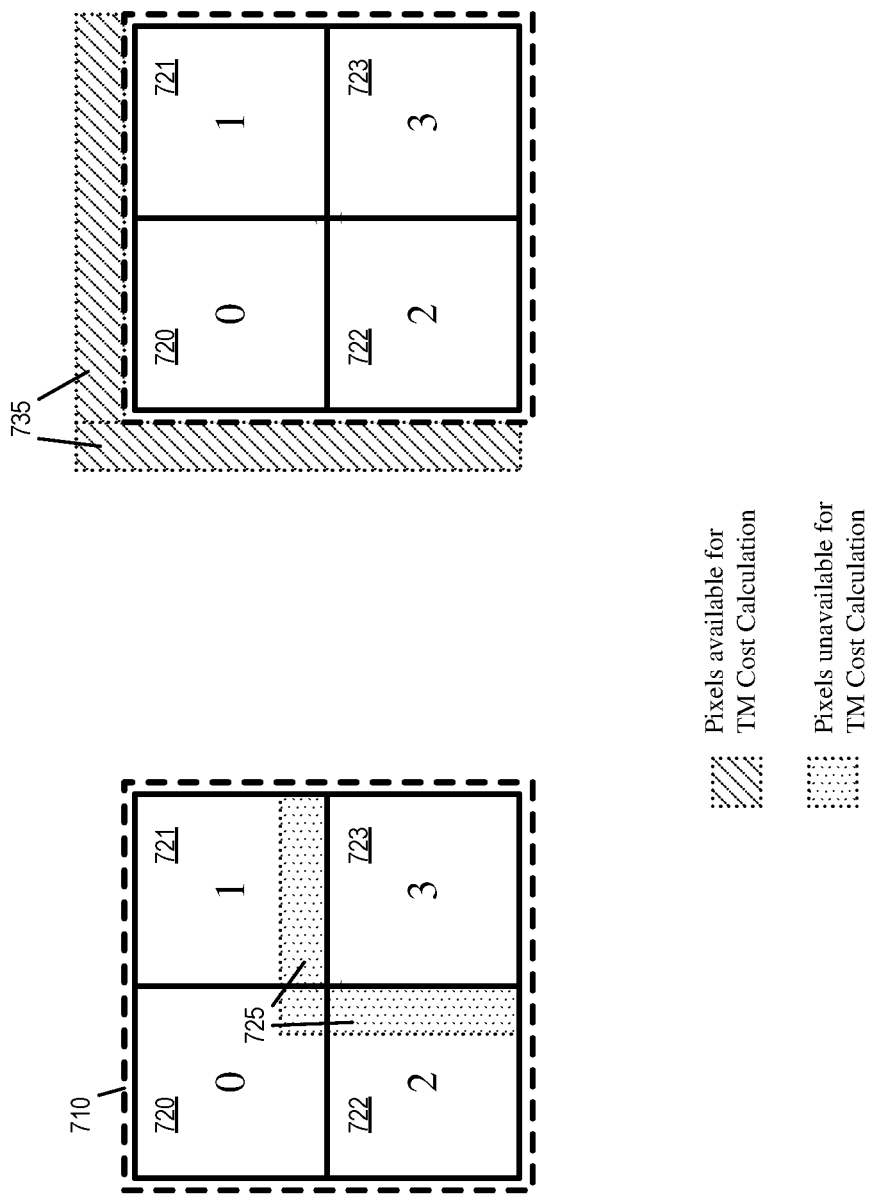
FIG. 7 conceptually illustrates using the L-shape template of an ancestor to compute the matching cost of the current block.

FIG. 7 conceptually illustrates using the L-shape template of an ancestor to compute the matching cost of the current CU. As illustrated, CUs 720-723 are split from an ancestor 710. When the CU 723 is the current CU being encoded or decoded, L-shaped template 725 is not used to compute the matching cost of the current CU 723. Instead, the L-shaped template 735 of the ancestor CU 710 is used to compute the matching cost of the current CU 723. The ancestor 710 of the current CU may be an ancestor CU of the current CU, or a VPDU that the current CU 723 belongs to, or a CTU that the current CU 723 belongs to.

III. Reduced Latency Template Retrieval from DRAM

In some embodiments, the video coder reduces latency due to retrieving pixels for the L-shaped template from DRAM. Specifically, the video coder computes the matching cost of the current CU by retrieving pixel data from only reference pictures identified as "major" reference pictures rather than from any reference pictures. (In some embodiments, reference pictures are ranked or sorted according to the number of reference blocks or CUs each reference picture contains or is referenced by, and the top K reference pictures in this ranking are designated as "major" reference pictures; or, in some embodiments, any reference picture that contains more than M reference blocks is considered a "major" reference picture; or, in some embodiments, any reference picture that includes at least one reference block or CU is considered a "major" reference picture.) Say there are A reference pictures, and among these, B reference pictures are identified as "major" reference pictures (A and B are positive integers). To minimize latency due to DRAM access, reference pixels are retrieved from only those B reference pictures in some embodiments.

In some embodiments, if a reference block for a prediction candidate of the current block or CU is not located in one of the major reference pictures, the video coder may exclude the reference block (or prediction candidate) from the candidate lists. In some embodiments, the video coder may project a reference block (or the corresponding MV) not in a major reference picture to one of the major reference pictures and include the projected reference block (or the projected MV) in the candidate list.

Figure 8:
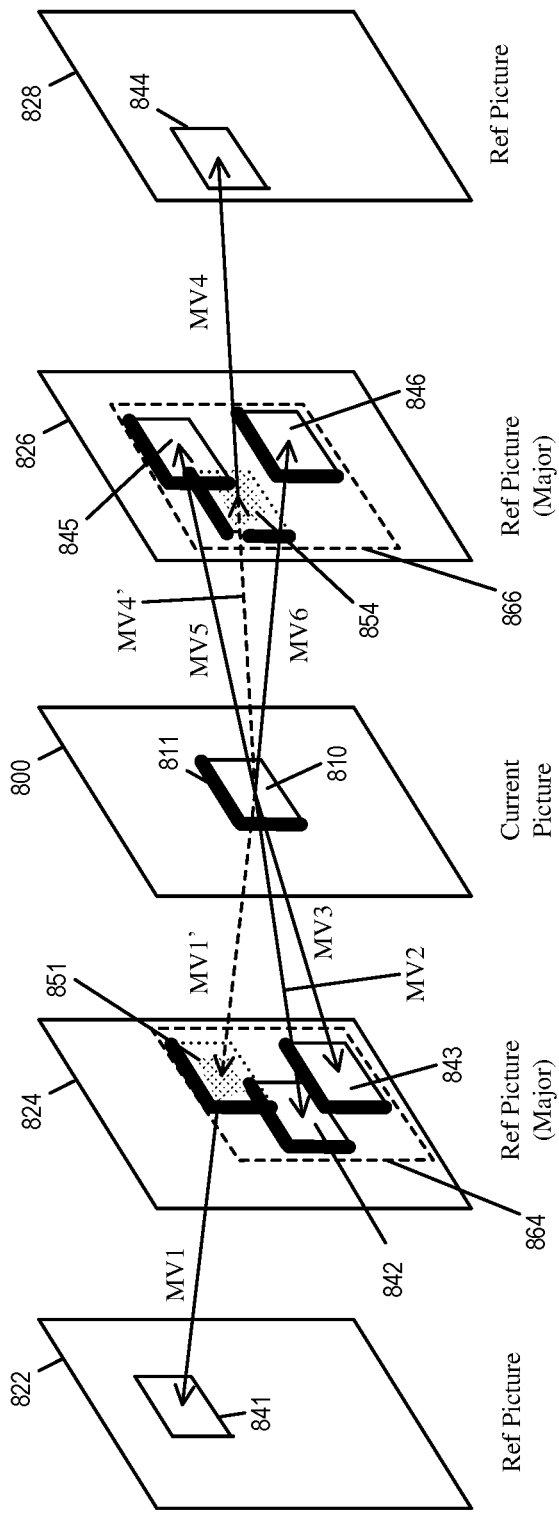
FIG. 8 conceptually illustrates using bounding blocks in major reference pictures to reduce latency in retrieving pixels for template matching.

FIG. 8 conceptually illustrates using bounding blocks in major reference pictures to reduce latency in retrieving pixels for template matching, particularly when retrieving pixels of reference pictures stored in DRAM. As illustrated, a current CU 810 in a current picture 800 is being coded (encoded or decoded). The prediction candidates of the current CU 810 include MV1-MV6 that reference blocks in reference pictures 822, 824, 826, and 828. Specifically, MV1 references block 841 in reference picture 822, MV2 references block 842 in reference picture 824, MV3 references block 843 in reference picture 824, MV4 references block 844 in reference picture 828, MV5 references block 845 in reference picture 826, and MV6 references block 846 in reference picture 826. The cost of each prediction candidate is determined by comparing the L-shaped template of the reference block with the L-shaped template 811 of the current CU 810.

In this example, the reference pictures 824 and 826 are designated as "major" reference pictures, because these reference pictures rank higher in terms of having more reference blocks (or have more candidate MVs that reference them). The reference pictures 822 and 828 are not designated as "major" reference pictures, because they rank lower for having fewer reference blocks.

Since the reference block 841 is located in the reference picture 822, which is not a major reference picture, its corresponding MV1 is scaled as MV1' and projected on to the major reference picture 824 as reference block 851. Likewise, the reference block 844 is located in the reference picture 828, which is not a major reference picture, so its corresponding MV4 is scaled as MV4' and projected on to the major reference picture 826 as reference block 854.

A bounding block (or bounding box) 864 in the reference picture 824 is defined to include the reference blocks 851, 842, and 843. A bounding block 866 in the reference picture 826 is defined to include the reference blocks 854, 845, and 846. The video coder reads a bounding block from the DRAM for each major reference picture. The DRAM access(es) that retrieves the bounding blocks 864 and 866 would include all or partial pixels of the L-shaped reference templates required for merge candidate reorder based on template matching cost for the CU 810.

In the example, the prediction candidates are reordered based on matching costs of L-shaped templates. In some embodiments, the prediction candidates are reordered based on matching costs of bilateral matching. The bilateral matching cost for a prediction candidate is determined by comparing or matching the reference pixels (or block) pointed to by the prediction candidate with the reference pixels pointed to by the mirror of the prediction candidate. In some embodiments, the video coder may identify a bounding block for each major reference picture for computing bilateral matching cost. Such a bounding block of a major reference picture may encompass reference blocks of prediction candidate(s) and/or reference blocks of some mirrors of prediction candidates that are in the major reference picture. The DRAM access(es) that retrieves such bounding blocks would include all or partial pixels of the reference blocks or mirror reference blocks required for merge candidate reorder based on bilateral matching cost.

Figure 9:
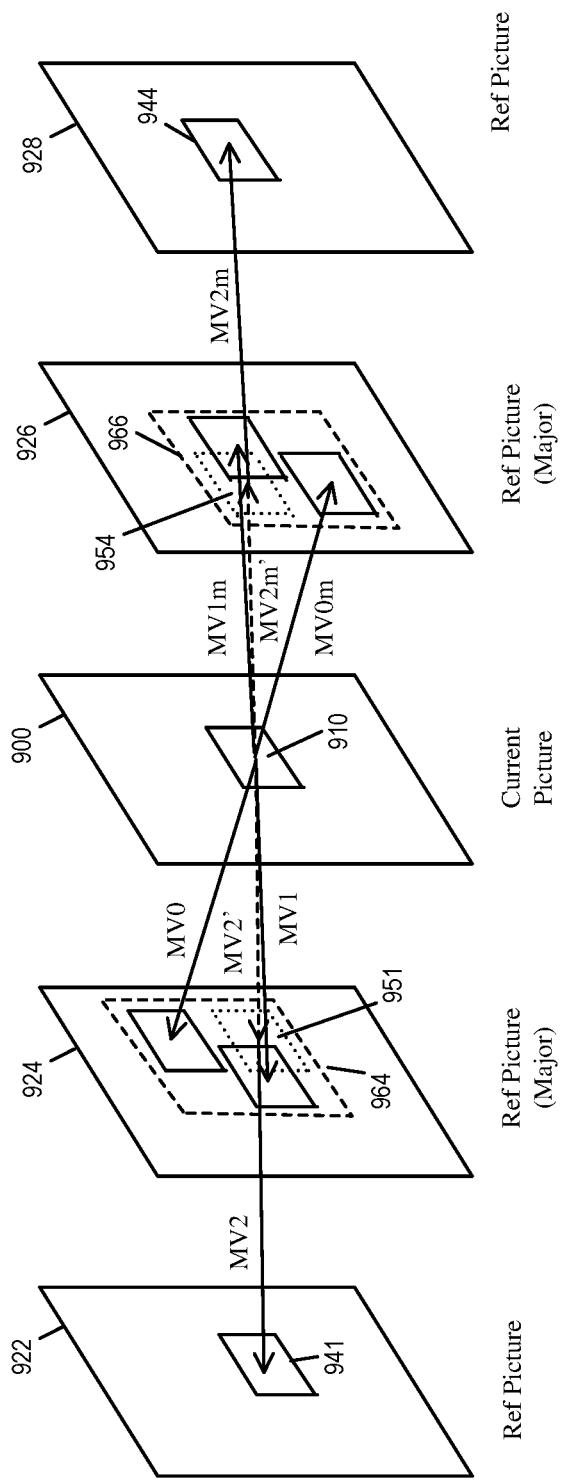
FIG. 9 conceptually illustrates using bounding blocks in major reference pictures to reduce latency in retrieving pixels for bilateral matching.

FIG. 9 conceptually illustrates using bounding blocks in major reference pictures to reduce latency in retrieving pixels for bilateral matching, particularly when retrieving pixels of reference pictures stored in DRAM. In the example, a current CU 910 in a current picture 900 is being coded. The prediction candidates (MV0, MV1, MV2) of the current CU 910 and their mirroring counterparts (MV0m, MV1m, MV2m) are located in reference pictures 922, 924, 926, and 928. Among these, the reference pictures 924 and 926 are identified as "major" reference pictures as they have the most reference blocks. The reference blocks 941 and 944 are located in non-major reference pictures 922 and 928. They are projected to the major reference pictures 924 and 926 as projected reference blocks 951 (MV2') and 954 (MV2m').

A bounding block 964 in the reference picture 924 is defined to include the reference blocks therein. A bounding block 966 in the reference picture 926 is defined to include the reference blocks therein. The video coder reads a bounding block from the DRAM for each major reference picture. The DRAM access(es) that retrieves the bounding blocks 964 and 966 would include all or partial pixels of the reference blocks and their mirror counterparts required for merge candidate reorder based on bilateral matching cost.

As mentioned, for each major reference picture, the video coder reads a bounding block from the DRAM that encompass all or some of the pixels that is required for performing prediction candidate reordering for one or several CUs. If the pixels required for (computing the matching cost for) merge reorder are not entirely encompassed by the bounding block, the video coder may use padding value to replace the required missing pixels. The video coder may also evaluate the loss (template matching cost) without using the missing pixels and enlarge the evaluated loss with a proper scale (scale the loss up to the full size of the L-shaped template). This method may be applied to LIC, as well as to several other methods of prediction candidate reordering such as L-shaped template (matching cost) based merge candidate reordering, bilateral based merge candidate reordering, etc.

Figure 10:
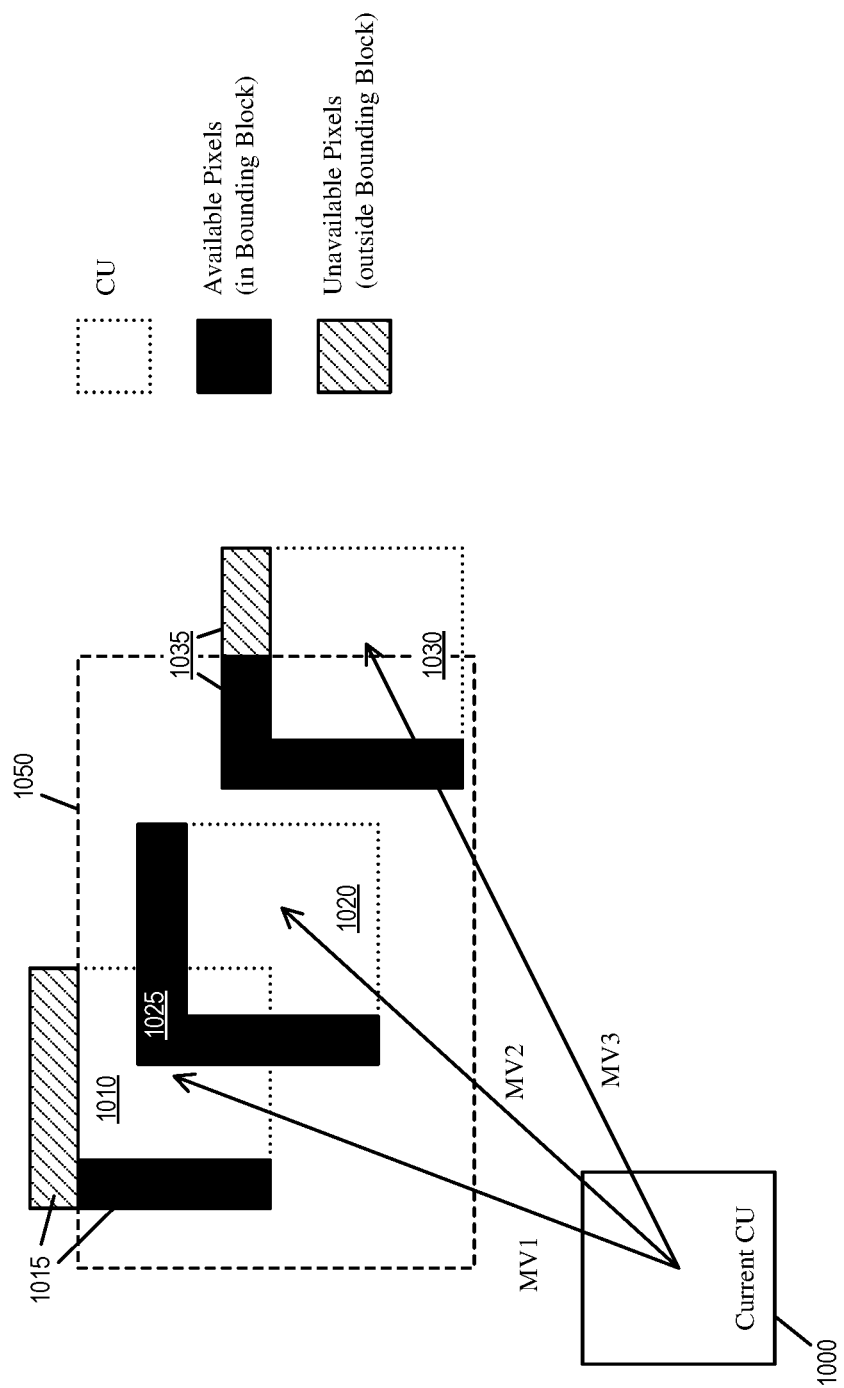
FIG. 10 conceptually illustrates handling unavailable pixels when computing template matching cost for prediction candidate reordering.

FIG. 10 conceptually illustrates handling unavailable pixels when computing template matching cost for prediction candidate reordering. The figure illustrates a current CU 1000 having several prediction candidates 1010, 1020, and 1030 that correspond to MV1, MV2, and MV3, respectively. The prediction candidates 1010, 1020, and 1030 have L-shaped templates 1015, 1025, and 1035, respectively. A bounding block 1050 is defined to encompass some or all pixels of the L-shaped templates. As illustrated, the bounding block 1050 encompass the L-shaped template 1025 entirely, but some of the pixels of the L-shape templates 1015 and 1035 are not included in the bounding block 1000. In other words, a DRAM access for the bounding block 1050 would not include all of the pixels of the L-shaped templates 1015 and 1035. The pixels of these templates that are outside of the bounding block 1050 are considered unavailable pixels.

The video coder may handle the unavailable pixels of the templates 1015 and 1035 by replacing them with padding values. The video coder may also evaluate the template matching cost or loss of the prediction candidates 1010 and 1030 without using the unavailable pixels, but instead enlarge or scale up the loss. For example, when using the template 1015 to compute the matching cost of the prediction candidate 1010, if 55% of the pixels of the template 1015 lie outside of the bounding block 1050 and therefore unavailable, the video coder may compute a matching cost for the prediction candidate 1010 based on the 45% of the template's pixels that are available then scale up the computed cost to 100%.

In some embodiments, multiple CUs, particularly CUs that are consecutive in decoding order, may share a same bounding block definition as they take turn being the current CU. Thus, one DRAM access for the content of the bounding block may provide pixels for computing the matching cost of prediction candidates for multiple different, consecutive CUs as they are coded.

Figure 11:
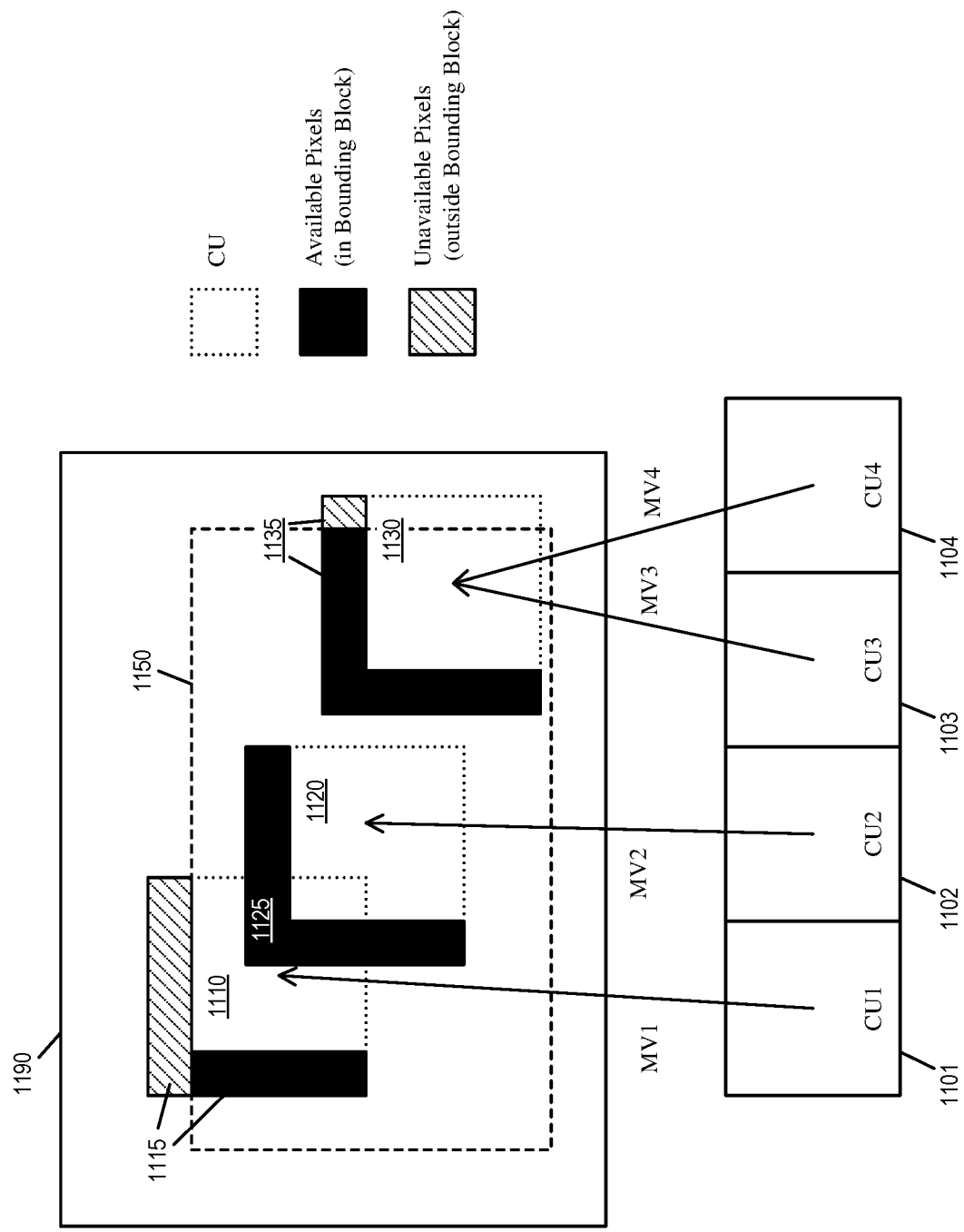
FIG. 11 conceptually illustrates multiple different blocks using the content of the same bounding block for matching cost calculation and prediction candidate reordering.

FIG. 11 conceptually illustrates multiple different CUs using the content of the same bounding block for matching cost calculation and prediction candidate reordering. As illustrated, CUs 1101, 1102, 1103 and 1104 are consecutive CUs in decoding order. The CU 1101 references a prediction candidate 1110 based on MV1. The CU 1102 references a prediction candidate 1120 based on MV2. The CU 1103 references a prediction candidate 1130 based on MV3. The CU 1104 also references the prediction candidate 1130, based on MV4. The prediction candidates 1110, 1120, 1130 have corresponding respective L-shaped templates 1115, 1125, and 1135. The L-shaped templates 1115, 1125, and 1135 all reference pixels in a reference picture 1100.

A bounding block 1150 is defined to include some or all of the pixels of the prediction candidates 1110, 1120, and 1130 and their L-shaped templates. Thus, the video coder may perform one DRAM access for the content of the bounding block 1150 and store the retrieved content temporarily in a faster memory structure (e.g., cache). For example, when the CU 1101 is the current block being coded, the stored content of the bounding block 1150 can be used to provide a portion of pixels of the template 1115, which are used to determine the matching cost of the prediction candidate 1110 and reordering of prediction candidates for coding the CU 1101. When the CU 1102 is the current block being coded, the stored content of the bounding block 1150 can be used to provide a portion of pixels of the template 1125, which are used to determine the matching cost of the prediction candidate 1120 and reordering of prediction candidates for coding the CU 1102. When the CU 1103 is the current block being coded, the stored content of the bounding block 1150 can be used to provide a portion of pixels of the template 1135, which are used to determine the matching cost of the prediction candidate 1130 and to reorder the prediction candidates for coding the CU 1103. Since the CU 1104 also uses the prediction candidate 1130, the same pixels can also be used for reordering the prediction candidates of the CU 1104.

IV. Example Video Encoder

Figure 12:
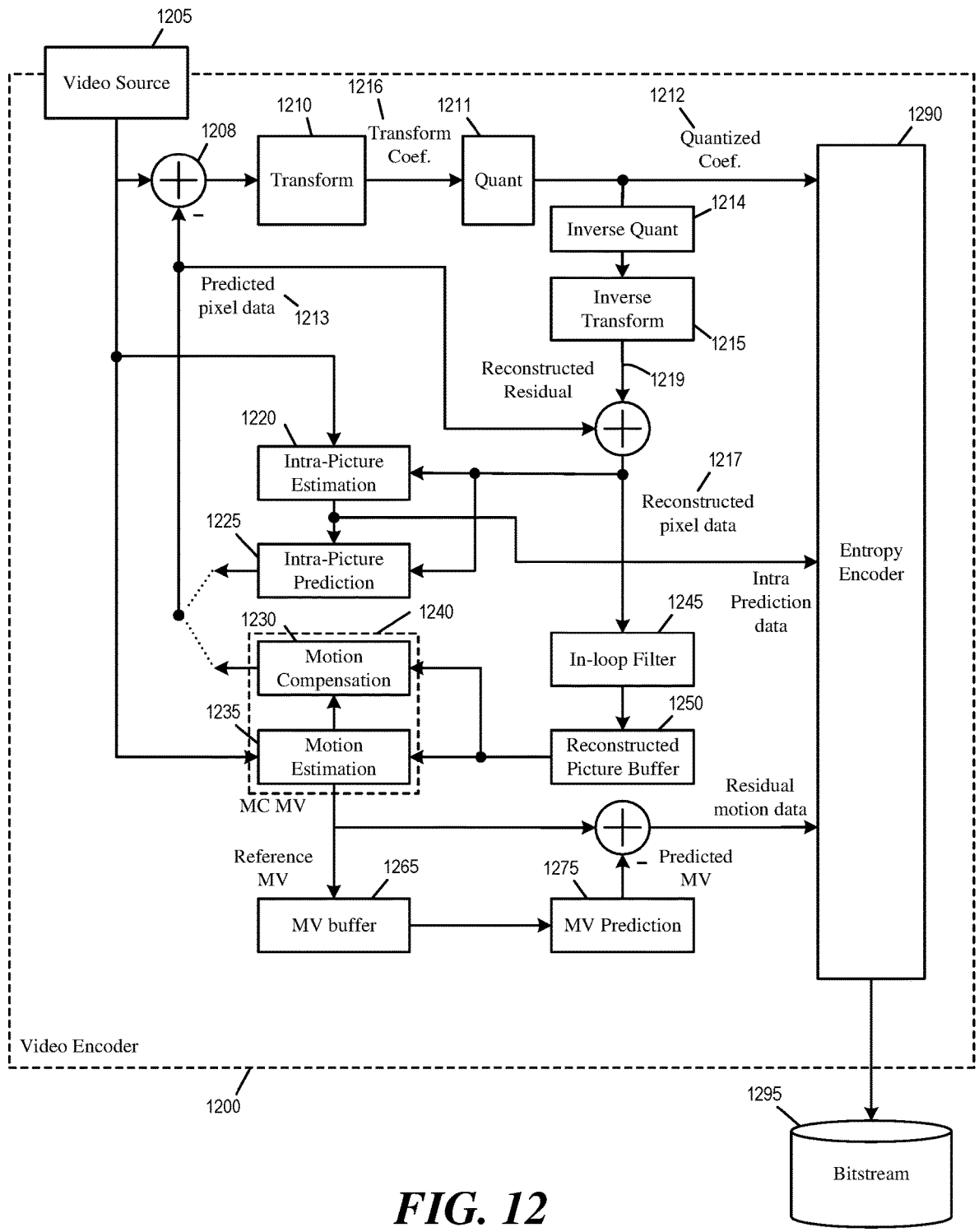
FIG. 12 illustrates an example video encoder that may signal selection of prediction candidates using cost-based reordered indices.

FIG. 12 illustrates an example video encoder 1200 that may signal selection of prediction candidates using cost-based reordered indices. As illustrated, the video encoder 1200 receives input video signal from a video source 1205 and encodes the signal into bitstream 1295. The video encoder 1200 has several components or modules for encoding the signal from the video source 1205, at least including some components selected from a transform module 1210, a quantization module 1211, an inverse quantization module 1214, an inverse transform module 1215, an intra-picture estimation module 1220, an intra-prediction module 1225, a motion compensation module 1230, a motion estimation module 1235, an in-loop filter 1245, a reconstructed picture buffer 1250, a MV buffer 1265, and a MV prediction module 1275, and an entropy encoder 1290. The motion compensation module 1230 and the motion estimation module 1235 are part of an inter-prediction module 1240.

In some embodiments, the modules 1210-1290 are modules of software instructions being executed by one or more processing units (e.g., a processor) of a computing device or electronic apparatus. In some embodiments, the modules 1210-1290 are modules of hardware circuits implemented by one or more integrated circuits (ICs) of an electronic apparatus. Though the modules 1210-1290 are illustrated as being separate modules, some of the modules can be combined into a single module.

The video source 1205 provides a raw video signal that presents pixel data of each video frame without compression. A subtractor 1208 computes the difference between the raw video pixel data of the video source 1205 and the predicted pixel data 1213 from the motion compensation module 1230 or intra-prediction module 1225. The transform module 1210 converts the difference (or the residual pixel data or residual signal 1208) into transform coefficients (e.g., by performing Discrete Cosine Transform, or DCT). The quantization module 1211 quantizes the transform coefficients into quantized data (or quantized coefficients) 1212, which is encoded into the bitstream 1295 by the entropy encoder 1290.

The inverse quantization module 1214 de-quantizes the quantized data (or quantized coefficients) 1212 to obtain transform coefficients, and the inverse transform module 1215 performs inverse transform on the transform coefficients to produce reconstructed residual 1219. The reconstructed residual 1219 is added with the predicted pixel data 1213 to produce reconstructed pixel data 1217. In some embodiments, the reconstructed pixel data 1217 is temporarily stored in a line buffer (not illustrated) for intra-picture prediction and spatial MV prediction. The reconstructed pixels are filtered by the in-loop filter 1245 and stored in the reconstructed picture buffer 1250. In some embodiments, the reconstructed picture buffer 1250 is a storage external to the video encoder 1200. In some embodiments, the reconstructed picture buffer 1250 is a storage internal to the video encoder 1200.

The intra-picture estimation module 1220 performs intra-prediction based on the reconstructed pixel data 1217 to produce intra prediction data. The intra-prediction data is provided to the entropy encoder 1290 to be encoded into bitstream 1295. The intra-prediction data is also used by the intra-prediction module 1225 to produce the predicted pixel data 1213.

The motion estimation module 1235 performs inter-prediction by producing MVs to reference pixel data of previously decoded frames stored in the reconstructed picture buffer 1250. These MVs are provided to the motion compensation module 1230 to produce predicted pixel data.

Instead of encoding the complete actual MVs in the bitstream, the video encoder 1200 uses MV prediction to generate predicted MVs, and the difference between the MVs used for motion compensation and the predicted MVs is encoded as residual motion data and stored in the bitstream 1295.

The MV prediction module 1275 generates the predicted MVs based on reference MVs that were generated for encoding previously video frames, i.e., the motion compensation MVs that were used to perform motion compensation. The MV prediction module 1275 retrieves reference MVs from previous video frames from the MV buffer 1265. The video encoder 1200 stores the MVs generated for the current video frame in the MV buffer 1265 as reference MVs for generating predicted MVs.

The MV prediction module 1275 uses the reference MVs to create the predicted MVs. The predicted MVs can be computed by spatial MV prediction or temporal MV prediction. The difference between the predicted MVs and the motion compensation MVs (MC MVs) of the current frame (residual motion data) are encoded into the bitstream 1295 by the entropy encoder 1290.

The entropy encoder 1290 encodes various parameters and data into the bitstream 1295 by using entropy-coding techniques such as context-adaptive binary arithmetic coding (CABAC) or Huffman encoding. The entropy encoder 1290 encodes various header elements, flags, along with the quantized transform coefficients 1212, and the residual motion data as syntax elements into the bitstream 1295. The bitstream 1295 is in turn stored in a storage device or transmitted to a decoder over a communications medium such as a network.

The in-loop filter 1245 performs filtering or smoothing operations on the reconstructed pixel data 1217 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 13:
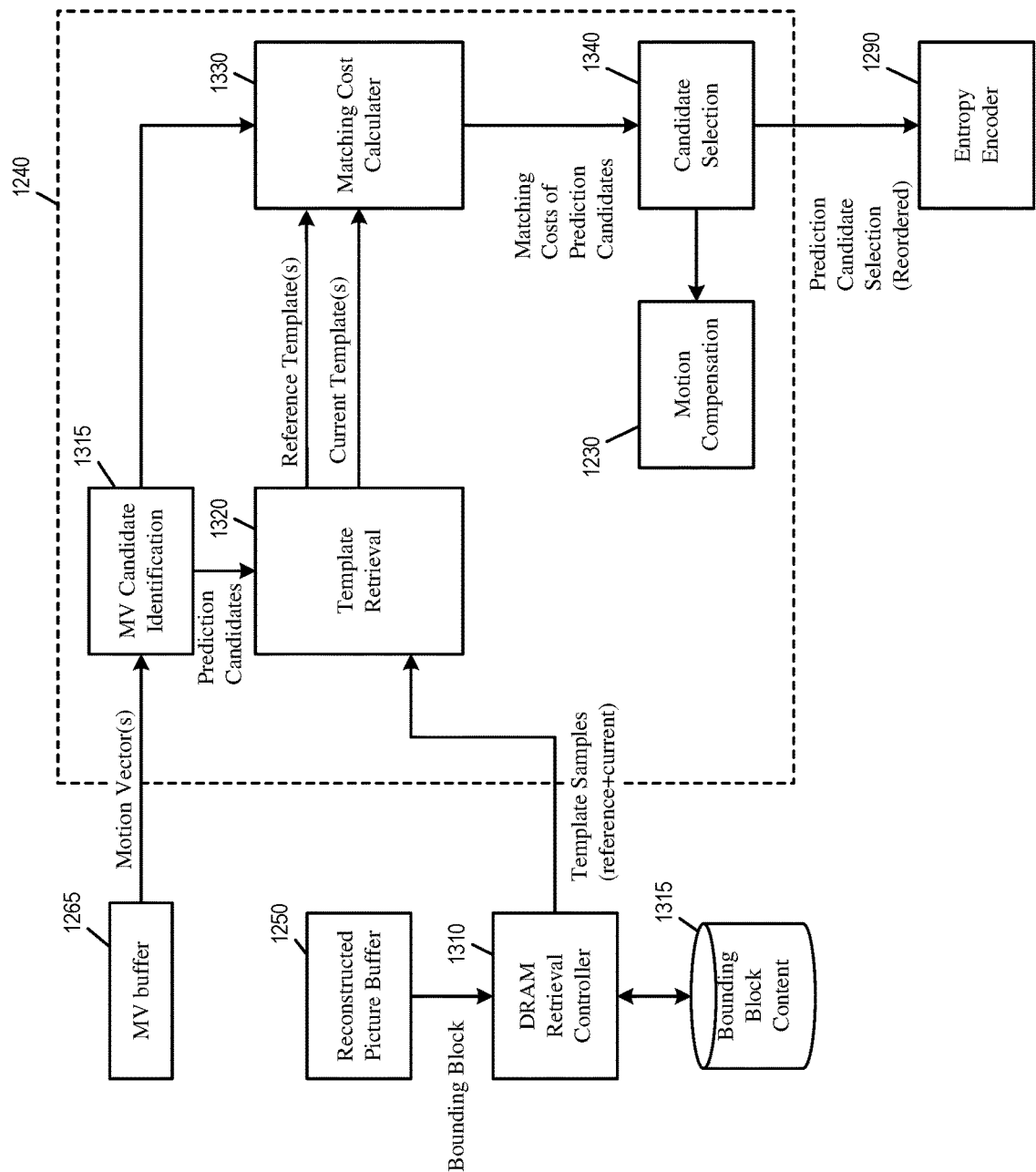
FIG. 13 illustrates portions of the video encoder that implement prediction candidate selection based on matching costs.

FIG. 13 illustrates portions of the video encoder 1200 that implement prediction candidate selection based on matching costs. Specifically, the figure illustrates the components of the inter-prediction module 1240 of the video encoder 1200 that retrieve pixels from DRAM as templates or mirrors for computing matching costs.

A DRAM retrieval controller 1310 controls the retrieval of pixel data from the reconstructed picture buffer 1250, which may be implemented by DRAM. The DRAM retrieval controller 1310 may identify a bounding block for a reference picture and retrieves the content of the bounding block from the reconstructed picture buffer 1250 into a bounding block content storage 1315.

For each prediction candidates in a list of candidates for coding the current block (e.g., merge candidate list), a template retrieval module 1320 retrieves pixels from the reconstructed picture buffer 1250 as samples for L-shaped templates (for template matching) or as mirrors (for bilateral matching), from the current and reference pictures. The template retrieval module 1320 may retrieve at least some of the samples by using the DRAM retrieval controller 1310, which may provide the template samples being retrieved from the bounding block content storage 1315 to minimize DRAM access latency.

The template retrieval module 1320 determines which pixels from which pictures should be fetched and used for computing matching costs. For example, the template retrieval module 1320 may designate some reference pictures as "major" reference pictures based on the number of prediction candidates that reference those pictures. The template retrieval module 1320 may project prediction candidates of non-major reference pictures to the major reference pictures and retrieve the pixels for the projected prediction candidates. The template retrieval module 1320 may also identify pixels as available or unavailable based on the pixels' positions. For example, pixels in recently reconstructed blocks (e.g., N most recent blocks in decoding order) may be identified as unavailable as template of the current block, while pixels that are outside of a DRAM retrieval bounding block may be identified as unavailable as templates of reference blocks.

The template retrieval module 1320 provides the reference template(s) and the current template(s) of the prediction candidates to a matching cost calculator 1330, which performs matching to produce the matching costs for the prediction candidates. The matching cost calculator 1330 may replace the unavailable pixels with padding values when computing the matching cost of a prediction candidate or compute the matching cost based on the available pixels only and then scale the computed cost to the entire template or mirror.

The computed matching costs of the various candidates are provided to a candidate selection module 1340, which may assign reordered indices to the prediction candidates based on the computed matching costs. The candidate selection module 1340 may then use the computed matching costs to select a lowest cost prediction candidate for encoding the current block. The selected prediction candidate (can be a merge candidate) is indicated to the motion compensation module 1230 to complete the prediction for encoding the current block. The selected prediction candidate is also provided to the entropy encoder 1290 to be signaled in the bitstream 1295. The selected prediction candidate may be signaled by using the prediction candidate's corresponding reordered index to reduce the number of bits transmitted.

Figure 14:
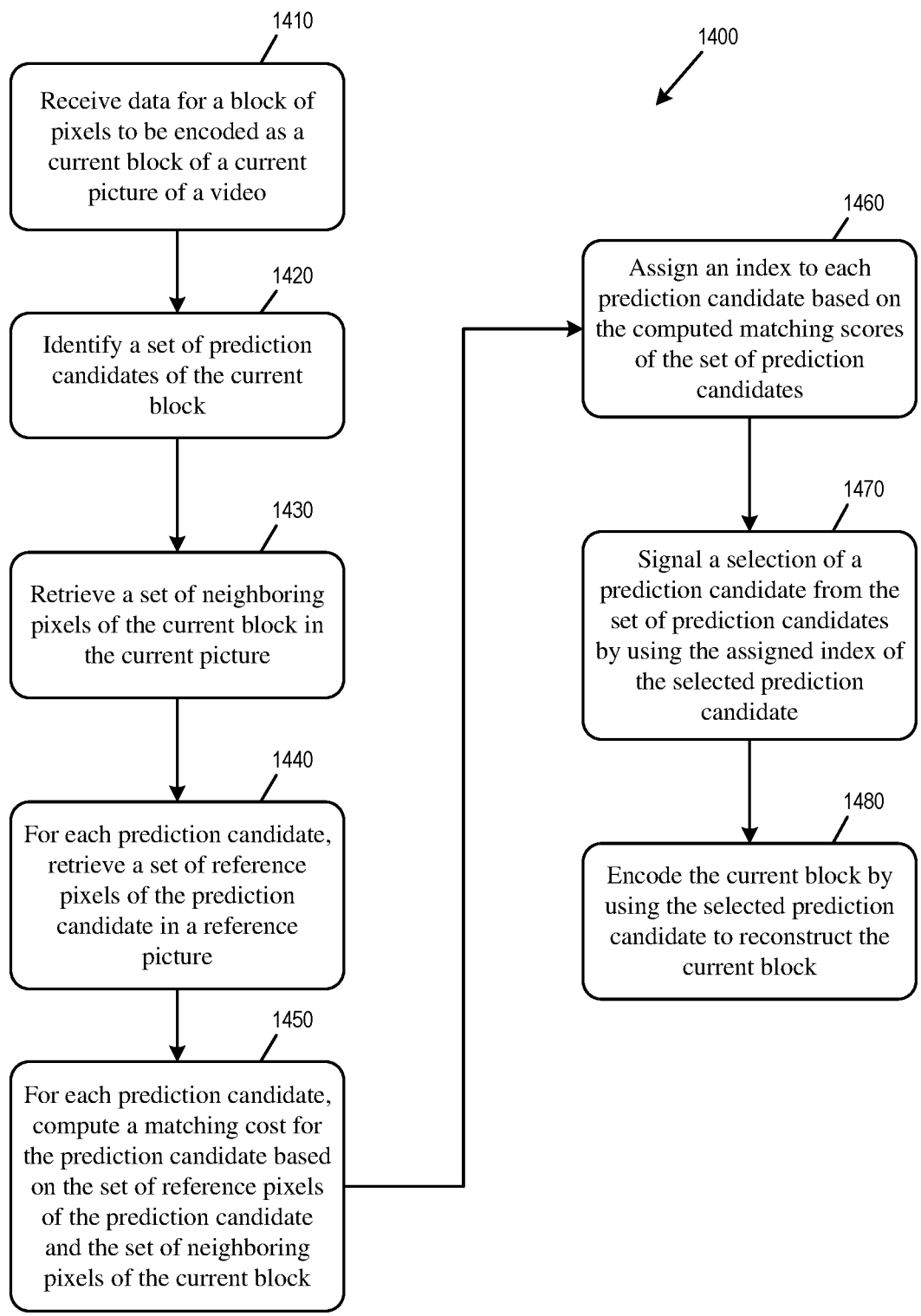
FIG. 14 conceptually illustrates a process for reducing latency when using reordered indices to select a prediction candidate to encode a block of pixels.

FIG. 14 conceptually illustrates a process 1400 for reducing latency when using reordered indices to select a prediction candidate to encode a block of pixels. In some embodiments, one or more processing units (e.g., a processor) of a computing device implements the encoder 1200 performs the process 1400 by executing instructions stored in a computer readable medium. In some embodiments, an electronic apparatus implementing the encoder 1200 performs the process 1400.

The encoder receives (at block 1410) data to be encoded as a current block of pixels in a current picture of a video. The encoder identifies (at block 1420) a set of prediction candidates of the current block. The set of prediction candidates may reference multiple reference pictures, and the video encoder may identify a subset of the reference pictures as "major" reference pictures based on a distribution of the prediction candidates among the reference pictures of the current block. In some embodiments, each major reference picture is referenced by more prediction candidates than any of the reference pictures that is not a major reference picture. For example, in some embodiments, reference pictures are ranked or sorted according to the number of reference blocks or CUs each reference picture contains, and the top N reference pictures in this ranking are designated as "major" reference pictures; or, in some embodiments, any reference picture that contains more than M reference blocks is considered a "major" reference picture; or, in some embodiments, any reference picture that includes at least one reference block or CU is considered a "major" reference picture. Major reference pictures are described by reference to FIG. 8 above.

The encoder retrieves (at block 1430) a set of neighboring pixels (e.g., L-shaped current template) of the current block from the current picture. The set of neighboring pixels of the current block may include a set of available pixels encompassed by a first block and a set of unavailable pixels encompassed by a second block. The first block is a block that is reconstructed before a threshold time (e.g., not one of the N most recently reconstructed blocks in decoding order) and the second block is a block that is reconstructed after a threshold time (e.g., one of the N most recently reconstructed blocks in decoding order). Designation of available and unavailable pixels as templates of the current block based on decoding order is described by reference to FIGS. 6A-B. In some embodiments, the available pixels and unavailable pixels may be distributed in multiple blocks, respectively. In other words, the set of available pixels may be encompassed by a first set of blocks and the set of unavailable pixels may be encompassed by a second set of blocks. The first set of blocks is reconstructed before the threshold time and the second set of blocks is reconstructed after the threshold time.

In some embodiments, the set of neighboring pixels available as L-shaped template of the current block include pixels that are adjacent to an ancestor or higher-level structure (e.g., CTU, VDPU) that includes the current block. However, pixels adjacent to the current block are not available. Designation of available and unavailable pixels as templates of the current block based on hierarchy is described by reference to FIG. 7 above.

The encoder retrieves (at block 1440), for each prediction candidate, a set of reference pixels (e.g., L-shaped reference template) of the prediction candidate from a reference picture. In some embodiments, a bounding block is defined for each "major" reference picture, the bounding block encompassing at least portions of multiple sets of reference pixels for multiple prediction candidates. The content of the bounding block may be retrievable by one single dynamic random-access memory (DRAM) access, or the content of the block is located in a same DRAM page. The encoder may store the retrieved content of the bounding block for encoding one or more blocks that are after the current block in decoding order. Bounding blocks are described by reference to FIGS. 8 and 10-11 above.

In some embodiments, a prediction candidate that references a non-major reference picture is scaled or projected to a major reference picture such that the projected prediction candidate references pixels in the major reference picture. A bounding block defined for the major reference picture may include the pixels referenced by the projected prediction candidate. In some embodiments, a prediction candidate that references a non-major reference picture is removed from the set of prediction candidates for the current block. The scaling of prediction candidates to major reference pictures is described by reference to FIG. 8 above.

The encoder computes (at block 1450), for each prediction candidate, a matching cost between the set of reference pixels of the prediction candidate and the set of neighboring pixels of the current block. In some embodiments, the reference pixels of a particular prediction candidate include a set of available pixels encompassed by the bounding block and a set of unavailable pixels not encompassed by the bounding block. The matching cost of the particular prediction candidate is computed based on the set of available pixels and not the set of unavailable pixels. In some embodiments, the matching cost is computed by replacing the set of unavailable pixels by padding values. In some embodiments, the matching cost is computed by scaling a cost computed based on the set of available pixels (and not the set of unavailable pixels) to all reference pixels of the particular prediction candidate. The computation of cost based on available and unavailable pixels of L-shaped templates due to bounding blocks are described by reference to FIG. 10 above.

In some embodiments, the matching costs are computed based on the set of available pixels and not the set of unavailable pixels of the neighboring pixels of the current block. In some embodiments, the matching costs are computed by replacing the set of unavailable pixels with padding values.

The encoder assigns (at block 1460) an index to each prediction candidate based on the computed matching cost of the set of prediction candidates.

The encoder signals (at block 1470) a selection of a prediction candidate from the set of prediction candidates by using the assigned index of the selected prediction candidate. The encoder encodes (at block 1480) the current block (e.g., into a bitstream) by using the selected prediction candidate to reconstruct the current block.

V. Example Video Decoder

In some embodiments, an encoder may signal (or generate) one or more syntax element in a bitstream, such that a decoder may parse said one or more syntax element from the bitstream.

Figure 15:
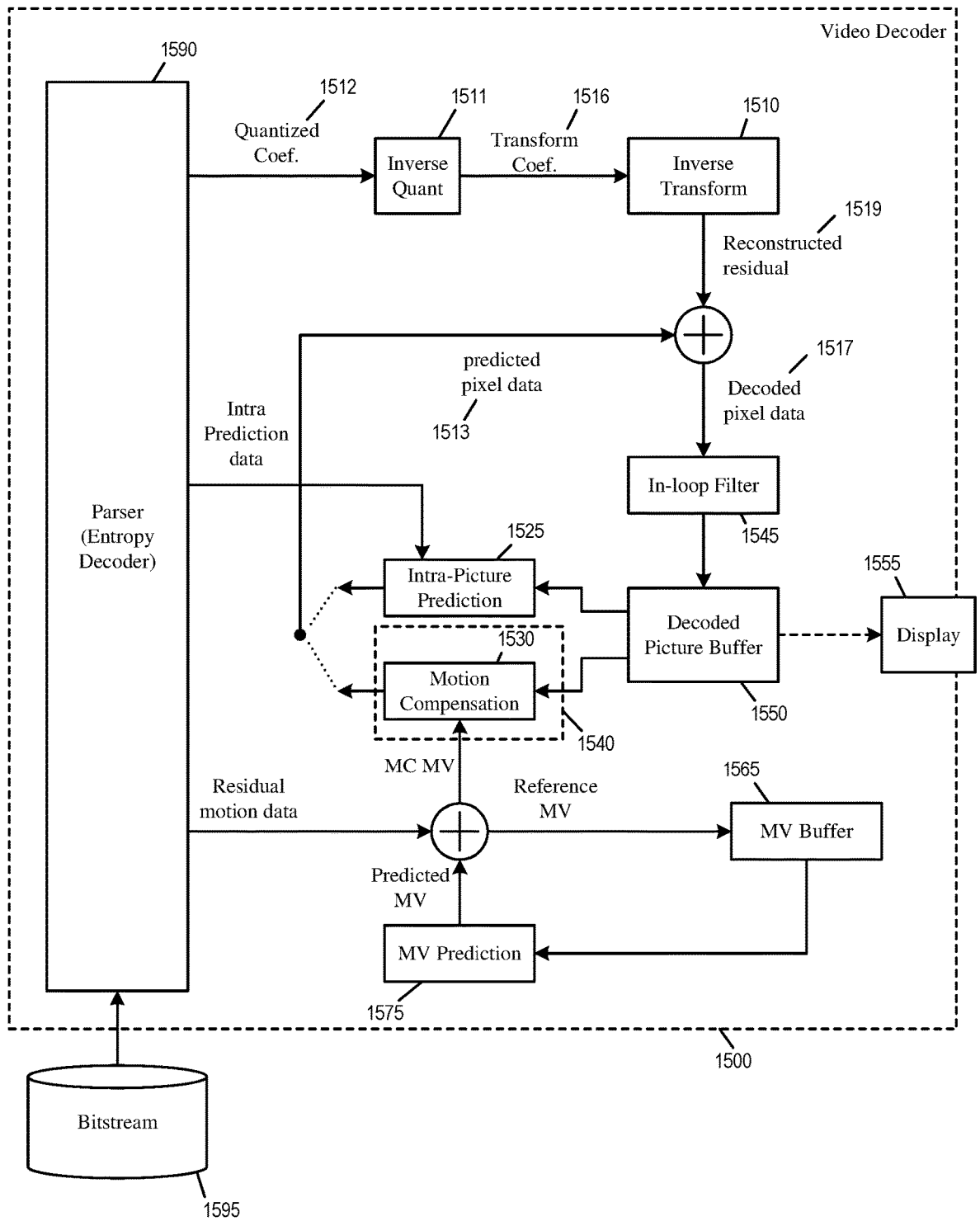
FIG. 15 illustrates an example video decoder that may receive selection of prediction candidates using cost-based reordered indices.

FIG. 15 illustrates an example video decoder 1500 that may receive selection of prediction candidates using cost-based reordered indices. As illustrated, the video decoder 1500 is an image-decoding or video-decoding circuit that receives a bitstream 1595 and decodes the content of the bitstream into pixel data of video frames for display. The video decoder 1500 has several components or modules for decoding the bitstream 1595, including some components selected from an inverse quantization module 1511, an inverse transform module 1510, an intra-prediction module 1525, a motion compensation module 1530, an in-loop filter 1545, a decoded picture buffer 1550, a MV buffer 1565, a MV prediction module 1575, and a parser 1590. The motion compensation module 1530 is part of an inter-prediction module 1540.

In some embodiments, the modules 1510-1590 are modules of software instructions being executed by one or more processing units (e.g., a processor) of a computing device. In some embodiments, the modules 1510-1590 are modules of hardware circuits implemented by one or more ICs of an electronic apparatus. Though the modules 1510-1590 are illustrated as being separate modules, some of the modules can be combined into a single module.

The parser 1590 (or entropy decoder) receives the bitstream 1595 and performs initial parsing according to the syntax defined by a video-coding or image-coding standard. The parsed syntax element includes various header elements, flags, as well as quantized data (or quantized coefficients) 1512. The parser 1590 parses out the various syntax elements by using entropy-coding techniques such as context-adaptive binary arithmetic coding (CABAC) or Huffman encoding.

The inverse quantization module 1511 de-quantizes the quantized data (or quantized coefficients) 1512 to obtain transform coefficients, and the inverse transform module 1510 performs inverse transform on the transform coefficients 1516 to produce reconstructed residual signal 1519. The reconstructed residual signal 1519 is added with predicted pixel data 1513 from the intra-prediction module 1525 or the motion compensation module 1530 to produce decoded pixel data 1517. The decoded pixels data are filtered by the in-loop filter 1545 and stored in the decoded picture buffer 1550. In some embodiments, the decoded picture buffer 1550 is a storage external to the video decoder 1500. In some embodiments, the decoded picture buffer 1550 is a storage internal to the video decoder 1500.

The intra-prediction module 1525 receives intra-prediction data from bitstream 1595 and according to which, produces the predicted pixel data 1513 from the decoded pixel data 1517 stored in the decoded picture buffer 1550. In some embodiments, the decoded pixel data 1517 is also stored in a line buffer (not illustrated) for intra-picture prediction and spatial MV prediction.

In some embodiments, the content of the decoded picture buffer 1550 is used for display. A display device 1555 either retrieves the content of the decoded picture buffer 1550 for display directly or retrieves the content of the decoded picture buffer to a display buffer. In some embodiments, the display device receives pixel values from the decoded picture buffer 1550 through a pixel transport.

The motion compensation module 1530 produces predicted pixel data 1513 from the decoded pixel data 1517 stored in the decoded picture buffer 1550 according to motion compensation MVs (MC MVs). These motion compensation MVs are decoded by adding the residual motion data received from the bitstream 1595 with predicted MVs received from the MV prediction module 1575.

The MV prediction module 1575 generates the predicted MVs based on reference MVs that were generated for decoding previous video frames, e.g., the motion compensation MVs that were used to perform motion compensation. The MV prediction module 1575 retrieves the reference MVs of previous video frames from the MV buffer 1565. The video decoder 1500 stores the motion compensation MVs generated for decoding the current video frame in the MV buffer 1565 as reference MVs for producing predicted MVs.

The in-loop filter 1545 performs filtering or smoothing operations on the decoded pixel data 1517 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 16:
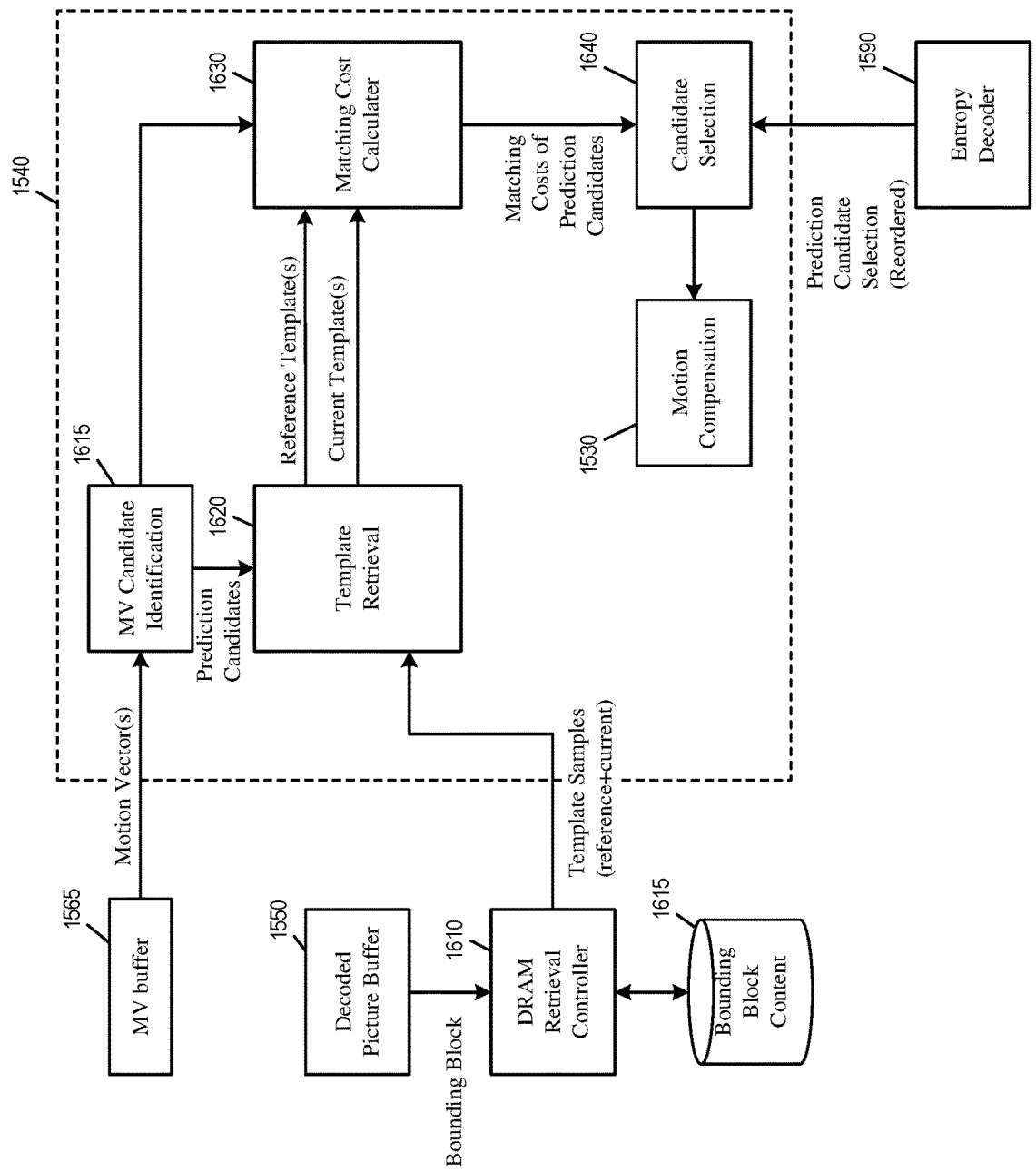
FIG. 16 illustrates portions of the video encoder that implement prediction candidate selection based on matching costs.

FIG. 16 illustrates portions of the video encoder 1500 that implement prediction candidate selection based on matching costs. Specifically, the figure illustrates the components of the inter-prediction module 1540 of the video encoder 1500 that retrieve pixels from DRAM as templates or mirrors for computing matching costs.

A DRAM retrieval controller 1610 controls the retrieval of pixel data from the decoded picture buffer 1550, which may be implemented by DRAM. The DRAM retrieval controller 1610 may identify a bounding block for a reference picture and retrieves the content of the bounding block from the decoded picture buffer 1550 into a bounding block content storage 1615.

For each prediction candidates in a list of candidates for coding the current block (e.g., merge candidate list), a template retrieval module 1620 retrieves pixels from the decoded picture buffer 1550 as samples for L-shaped templates (for template matching) or as mirrors (for bilateral matching), from the current and reference pictures. The template retrieval module 1620 may retrieve at least some of the samples by using the DRAM retrieval controller 1610, which may provide the template samples being retrieved from the bounding block content storage 1615 to minimize DRAM access latency.

The template retrieval module 1620 determines which pixels from which pictures should be fetched and used for computing matching costs. For example, the template retrieval module 1620 may designate some reference pictures as "major" reference pictures based on the number of prediction candidates that reference those pictures. The template retrieval module 1620 may project prediction candidates of non-major reference pictures to the major reference pictures and retrieve the pixels for the projected prediction candidates. The template retrieval module 1620 may also identify pixels as available or unavailable based on the pixels' positions. For example, pixels in recently reconstructed blocks (e.g., N most recent blocks in decoding order) may be identified as unavailable as template of the current block, while pixels that are outside of a DRAM retrieval bounding block may be identified as unavailable as templates of reference blocks.

The template retrieval module 1620 provides the reference template(s) and the current template(s) of the prediction candidates to a matching cost calculator 1630, which performs matching to produce the matching costs for the prediction candidates. The matching cost calculator 1630 may replace the unavailable pixels with padding values when computing the matching cost of a prediction candidate or compute the matching cost based on the available pixels only and then scale the computed cost to the entire template or mirror.

The computed matching costs of the various candidates are provided to a candidate selection module 1640, which may assign reordered indices to the prediction candidates based on the computed matching costs.

The entropy decoder 1590 may receive signaling of the selection of a prediction candidate for the current block (from e.g., the bitstream 1595). The selected prediction candidate may be signaled by using the prediction candidate's corresponding reordered index to reduce the number of bits transmitted. The selected prediction candidate (can be a merge candidate) is indicated to the motion compensation module 1530 to complete the prediction for decoding the current block.

Figure 17:
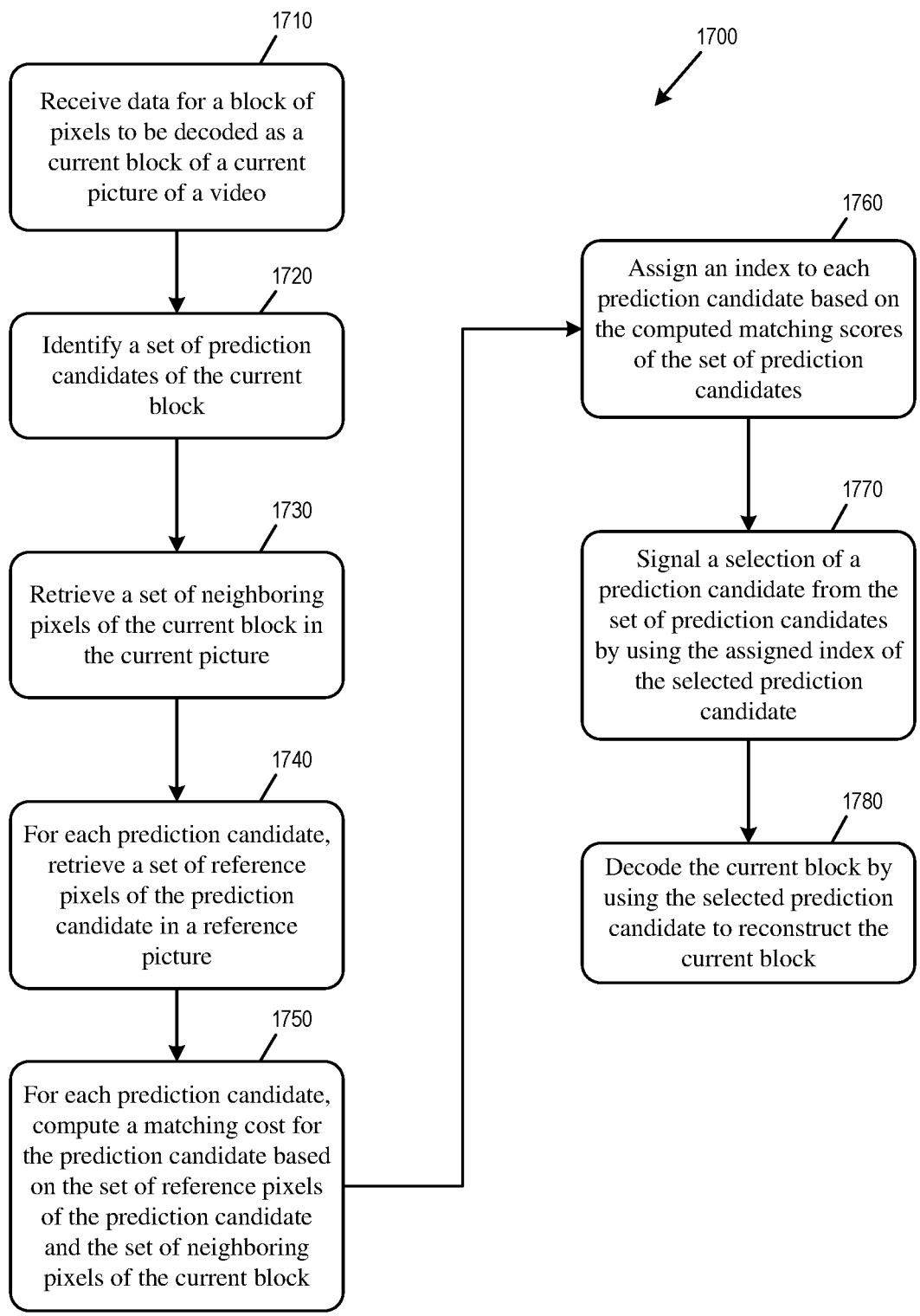
FIG. 17 conceptually illustrates a process for reducing latency when using reordered indices to select a prediction candidate to decode a block of pixels.

FIG. 17 conceptually illustrates a process 1700 for reducing latency when using reordered indices to select a prediction candidate to decode a block of pixels. In some embodiments, one or more processing units (e.g., a processor) of a computing device implements the decoder 1500 performs the process 1700 by executing instructions stored in a computer readable medium. In some embodiments, an electronic apparatus implementing the decoder 1500 performs the process 1700.

The decoder receives (at block 1710) data to be decoded as a current block of pixels in a current picture of a video.

The decoder identifies (at block 1720) a set of prediction candidates of the current block. The set of prediction candidates may reference multiple reference pictures, and the video decoder may identify a subset of the reference pictures as "major" reference pictures based on a distribution of the prediction candidates among the reference pictures of the current block. In some embodiments, each major reference picture is referenced by more prediction candidates than any of the reference pictures that is not a major reference picture. For example, in some embodiments, reference pictures are ranked or sorted according to the number of reference blocks or CUs each reference picture contains, and the top N reference pictures in this ranking are designated as "major" reference pictures; or, in some embodiments, any reference picture that contains more than M reference blocks is considered a "major" reference picture; or, in some embodiments, any reference picture that includes at least one reference block or CU is considered a "major" reference picture. Major reference pictures are described by reference to FIG. 8 above.

The decoder retrieves (at block 1730) a set of neighboring pixels (e.g., L-shaped current template) of the current block from the current picture. The set of neighboring pixels of the current block may include a set of available pixels encompassed by a first block and a set of unavailable pixels encompassed by a second block. The first block is a block that is reconstructed before a threshold time (e.g., not one of the N most recently reconstructed blocks in decoding order) and the second block is a block that is reconstructed after a threshold time (e.g., one of the N most recently reconstructed blocks in decoding order). Designation of available and unavailable pixels as templates of the current block based on decoding order is described by reference to FIGS. 6A-B. In some embodiments, the available pixels and unavailable pixels may be distributed in multiple blocks, respectively. Accordingly, the set of available pixels may be encompassed by a first set of blocks and the set of unavailable pixels may be encompassed by a second set of blocks. The first set of blocks is reconstructed before the threshold time and the second set of blocks is reconstructed after the threshold time.

In some embodiments, the set of neighboring pixels available as L-shaped template of the current block include pixels that are adjacent to an ancestor or higher-level structure (e.g., CTU, VDPU) that includes the current block. However, pixels adjacent to the current block are not available. Designation of available and unavailable pixels as templates of the current block based on hierarchy is described by reference to FIG. 7 above.

The decoder retrieves (at block 1740), for each prediction candidate, a set of reference pixels (e.g., L-shaped reference template) of the prediction candidate from a reference picture. In some embodiments, a bounding block is defined for each "major" reference picture, the bounding block encompassing at least portions of multiple sets of reference pixels for multiple prediction candidates. The content of the bounding block may be retrievable by one single dynamic random-access memory (DRAM) access, or the content of the block is located in a same DRAM page. The decoder may store the retrieved content of the bounding block for decoding one or more blocks that are after the current block in decoding order. Bounding blocks are described by reference to FIGS. 8 and 10-11 above.

In some embodiments, a prediction candidate that references a non-major reference picture is scaled or projected to a major reference picture such that the projected prediction candidate references pixels in the major reference picture. A bounding block defined for the major reference picture may include the pixels referenced by the projected prediction candidate. In some embodiments, a prediction candidate that references a non-major reference picture is removed from the set of prediction candidates for the current block. The scaling of prediction candidates to major reference pictures is described by reference to FIG. 8 above.

The decoder computes (at block 1750), for each prediction candidate, a matching cost between the set of reference pixels of the prediction candidate and the set of neighboring pixels of the current block. In some embodiments, the reference pixels of a particular prediction candidate include a set of available pixels encompassed by the bounding block and a set of unavailable pixels not encompassed by the bounding block. The matching cost of the particular prediction candidate is computed based on the set of available pixels and not the set of unavailable pixels. In some embodiments, the matching cost is computed by replacing the set of unavailable pixels by padding values. In some embodiments, the matching cost is computed by scaling a cost computed based on the set of available pixels (and not the set of unavailable pixels) to all reference pixels of the particular prediction candidate. The computation of cost based on available and unavailable pixels of L-shaped templates due to bounding blocks are described by reference to FIG. 10 above.

In some embodiments, the matching costs are computed based on the set of available pixels and not the set of unavailable pixels of the neighboring pixels of the current block. In some embodiments, the matching costs are computed by replacing the set of unavailable pixels with padding values.

The decoder assigns (at block 1760) an index to each prediction candidate based on the computed matching cost of the set of prediction candidates. The decoder signals (at block 1770) a selection of a prediction candidate from the set of prediction candidates by using the assigned index of the selected prediction candidate. The decoder decodes (at block 1780) the current block (e.g., into a bitstream) by using the selected prediction candidate to reconstruct the current block. The decoder may then provide the reconstructed current block for display as part of the reconstructed current picture.

VI. Example Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 18:
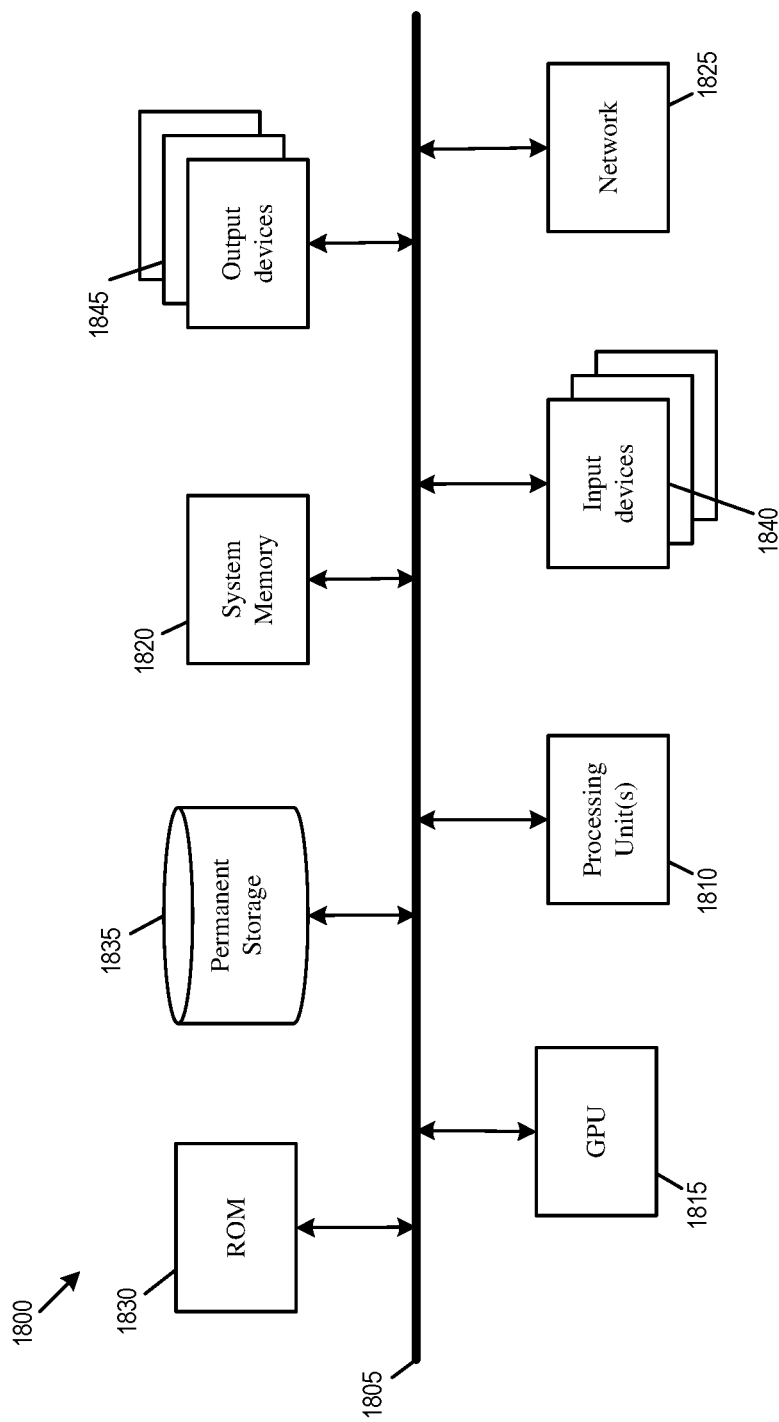
FIG. 18 conceptually illustrates an electronic system with which some embodiments of the present disclosure are implemented.

FIG. 18 conceptually illustrates an electronic system 1800 with which some embodiments of the present disclosure are implemented. The electronic system 1800 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 1800 includes a bus 1805, processing unit(s) 1810, a graphics-processing unit (GPU) 1815, a system memory 1820, a network 1825, a read-only memory 1830, a permanent storage device 1835, input devices 1840, and output devices 1845.

The bus 1805 collectively represents all system, peripheral, and chipset buses that communicatively connect the numerous internal devices of the electronic system 1800. For instance, the bus 1805 communicatively connects the processing unit(s) 1810 with the GPU 1815, the read-only memory 1830, the system memory 1820, and the permanent storage device 1835.

From these various memory units, the processing unit(s) 1810 retrieves instructions to execute and data to process in order to execute the processes of the present disclosure. The processing unit(s) may be a single processor or a multi-core processor in different embodiments. Some instructions are passed to and executed by the GPU 1815. The GPU 1815 can offload various computations or complement the image processing provided by the processing unit(s) 1810.

The read-only-memory (ROM) 1830 stores static data and instructions that are used by the processing unit(s) 1810 and other modules of the electronic system. The permanent storage device 1835, on the other hand, is a read-and-write memory device. This device is a non-volatile memory unit that stores instructions and data even when the electronic system 1800 is off. Some embodiments of the present disclosure use a mass-storage device (such as a magnetic or optical disk and its corresponding disk drive) as the permanent storage device 1835.

Other embodiments use a removable storage device (such as a floppy disk, flash memory device, etc., and its corresponding disk drive) as the permanent storage device. Like the permanent storage device 1835, the system memory 1820 is a read-and-write memory device. However, unlike storage device 1835, the system memory 1820 is a volatile read-and-write memory, such a random access memory. The system memory 1820 stores some of the instructions and data that the processor uses at runtime. In some embodiments, processes in accordance with the present disclosure are stored in the system memory 1820, the permanent storage device 1835, and/or the read-only memory 1830. For example, the various memory units include instructions for processing multimedia clips in accordance with some embodiments. From these various memory units, the processing unit(s) 1810 retrieves instructions to execute and data to process in order to execute the processes of some embodiments.

The bus 1805 also connects to the input and output devices 1840 and 1845. The input devices 1840 enable the user to communicate information and select commands to the electronic system. The input devices 1840 include alphanumeric keyboards and pointing devices (also called "cursor control devices"), cameras (e.g., webcams), microphones or similar devices for receiving voice commands, etc. The output devices 1845 display images generated by the electronic system or otherwise output data. The output devices 1845 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 18, bus 1805 also couples electronic system 1800 to a network 1825 through a network adapter (not shown). In this manner, the computer can be a part of a network of computers (such as a local area network ("LAN"), a wide area network ("WAN"), or an Intranet, or a network of networks, such as the Internet. Any or all components of electronic system 1800 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the present disclosure has been described with reference to numerous specific details, one of ordinary skill in the art will recognize that the present disclosure can be embodied in other specific forms without departing from the spirit of the present disclosure. In addition, a number of the figures (including FIG. 14 and FIG. 17) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the present disclosure is not to be limited by the foregoing illustrative details, but rather is to be defined by the appended claims.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A video coding method comprising:
    receiving data for a block of pixels to be encoded or decoded as a current block of a current picture of a video;
    for each prediction candidate of a set of one or more prediction candidates of the current block, computing a matching cost between a set of reference pixels of the prediction candidate in a reference picture and a set of neighboring pixels of the current block in the current picture;
    assigning an index to each prediction candidate based on the computed matching cost of the set of prediction candidates;
    signaling or receiving a selection of a prediction candidate from the set of prediction candidates by using the assigned index of the selected prediction candidate; and
    encoding or decoding the current block by using the selected prediction candidate to reconstruct the current block.

2. The video coding method of claim 1, wherein the set of prediction candidates references a plurality of reference pictures, the method further comprising identifying a subset of the reference pictures as major reference pictures based on a distribution of the prediction candidates among the reference pictures of the current block.

3. The video coding method of claim 2, wherein a bounding block is defined for a major reference picture, the bounding block encompassing at least portions of multiple sets of reference pixels for multiple prediction candidates.

4. The video coding method of claim 3, wherein the content of the bounding block is retrievable by one single dynamic random access memory (DRAM) access.

5. The video coding method of claim 4, wherein the retrieved content of the bounding block is stored for encoding or decoding one or more blocks that are after the current block in coding order.

6. The video coding method of claim 3, wherein a prediction candidate that references a first, non-major reference picture is projected to a second, major reference picture such that the projected prediction candidate references pixels in the second major reference picture, wherein a bounding block defined for the second major reference picture includes at least a portion of the pixels referenced by the projected prediction candidate.

7. The video coding method of claim 3, wherein a prediction candidate that references a non-major reference picture is removed from the set of prediction candidates for the current block.

8. The video coding method of claim 3, wherein the reference pixels of a particular prediction candidate comprise a set of available pixels encompassed by the bounding block and a set of unavailable pixels not encompassed by the bounding block, wherein the matching cost of the particular prediction candidate is computed based on the set of available pixels and not on the set of unavailable pixels.

9. The video coding method of claim 8, wherein the matching cost is computed by replacing the set of unavailable pixels by padding values.

10. The video coding method of claim 8, wherein the matching cost is computed by scaling a cost computed based on the set of available pixels and not on the set of unavailable pixels to all reference pixels of the particular prediction candidate.

11. The video coding method of claim 1, wherein the set of neighboring pixels of the current block comprises a set of available pixels encompassed by a first block and a set of unavailable pixels encompassed by a second block, wherein the first block is not one of N most recently reconstructed blocks and the second block is one of N most recently reconstructed blocks.

12. The video coding method of claim 11, wherein the matching costs are computed based on the set of available pixels and not on the set of unavailable pixels of the neighboring pixels of the current block.

13. The video coding method of claim 12, wherein the matching costs are computed by replacing the set of unavailable pixels with padding values.

14. The video coding method of claim 1, wherein the set of neighboring pixels comprises pixels that are adjacent to an ancestor structure that includes the current block but not adjacent to the current block.

15. An electronic apparatus comprising:
a video coding circuit configured to perform operations comprising:
- receiving data for a block of pixels to be encoded or decoded as a current block of a current picture of a video;
- for each prediction candidate of a set of one or more prediction candidates of the current block, computing a matching cost between a set of reference pixels of the prediction candidate in a reference picture and a set of neighboring pixels of the current block in the current picture;
- assigning an index to each prediction candidate based on the computed matching cost of the set of prediction candidates;
- signaling or receiving a selection of a prediction candidate from the set of prediction candidates by using the assigned index of the selected prediction candidate; and
- encoding or decoding the current block by using the selected prediction candidate to reconstruct the current block.

* * * * *